(12) United States Patent
Tay

(10) Patent No.: US 10,993,570 B2
(45) Date of Patent: *May 4, 2021

(54) TROPHY ASSEMBLING SYSTEMS AND METHODS

(71) Applicant: Electro Mechanical Industries Pte Ltd, Singapore (SG)

(72) Inventor: Wee Soon Tay, Singapore (SG)

(73) Assignee: Electro Mechanical Industries Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,021

(22) Filed: Sep. 3, 2020

(65) Prior Publication Data
US 2020/0397173 A1 Dec. 24, 2020

Related U.S. Application Data

(63) Continuation of application No. 15/459,000, filed on Mar. 15, 2017, now Pat. No. 10,799,052.

(60) Provisional application No. 62/309,443, filed on Mar. 16, 2016.

(30) Foreign Application Priority Data

Jul. 8, 2016 (SG) .............................. 10201605604T

(51) Int. Cl.
*A47G 33/00* (2006.01)
*F16B 21/02* (2006.01)

(52) U.S. Cl.
CPC ............ *A47G 33/004* (2013.01); *F16B 21/02* (2013.01)

(58) Field of Classification Search
CPC .............................. A47G 33/004; F16B 21/04
See application file for complete search history.

(56) References Cited

U.S. PATENT DOCUMENTS

| | | | | |
|---|---|---|---|---|
| 2,291,975 A | * | 8/1942 | Minero | A47B 13/06 |
| | | | | 248/418 |
| 3,027,670 A | * | 4/1962 | Kramer | A47G 33/004 |
| | | | | 428/542.4 |
| 3,595,727 A | * | 7/1971 | Allen | A47G 33/004 |
| | | | | 248/176.1 |

(Continued)

FOREIGN PATENT DOCUMENTS

| | | |
|---|---|---|
| CN | 102124261 A | 7/2011 |
| CN | 204015337 U | 12/2014 |

(Continued)

*Primary Examiner* — Bradley Duckworth
(74) *Attorney, Agent, or Firm* — Horizon IP Pte Ltd.

(57) ABSTRACT

Trophy assembly and methods for assembling a trophy are disclosed. A trophy assembly includes a first trophy component, a second trophy component and a locking mechanism for engaging at least the first and second trophy components to form the trophy assembly. The locking mechanism includes at least a male connector and a female connector. The male connector includes a first configuration which matches with a second configuration of the female connector such that when the male connector mates with the female connector, the at least first and second trophy components are engaged with each other through a twisting or rotating motion to provide a secured connection between the at least first and second trophy components.

20 Claims, 14 Drawing Sheets

(56) References Cited

U.S. PATENT DOCUMENTS

| | | | | |
|---|---|---|---|---|
| 3,720,430 A * | 3/1973 | St. Paul | .............. | A47G 33/004 403/118 |
| 4,305,180 A * | 12/1981 | Schwartz | ............... | F16B 21/04 439/296 |
| 5,322,739 A * | 6/1994 | Stagl | ................... | A47G 33/004 428/542.4 |
| 6,060,171 A * | 5/2000 | Greenblat | ........... | A47G 33/004 428/13 |
| 6,828,034 B2 * | 12/2004 | Banman | .............. | A47G 33/004 40/358 |
| 7,001,668 B2 * | 2/2006 | Banman | ................. | G09F 19/00 40/358 |
| 7,572,520 B2 | 8/2009 | Surber | | |
| 8,353,496 B2 * | 1/2013 | Schwartz | ............ | A47G 33/004 248/346.03 |
| 2001/0000617 A1 * | 5/2001 | Tracy | ..................... | B60N 3/10 248/154 |
| 2007/0092333 A1 * | 4/2007 | Viscount | ............. | A63C 19/062 403/349 |
| 2009/0146025 A1 | 6/2009 | Schwartz | | |
| 2010/0129574 A1 | 5/2010 | Schwartz | | |
| 2011/0183150 A1 | 7/2011 | Brown et al. | | |
| 2015/0305539 A1 * | 10/2015 | Schwartz | ............ | A47G 33/004 428/542.4 |
| 2016/0058228 A1 | 3/2016 | Liao | | |
| 2019/0183274 A1 * | 6/2019 | Peters | ................. | A47G 33/004 |

FOREIGN PATENT DOCUMENTS

| | | |
|---|---|---|
| CN | 204812421 U | 12/2015 |
| GB | 2149326 A | 6/1985 |
| WO | 2017150969 A1 | 9/2018 |

* cited by examiner

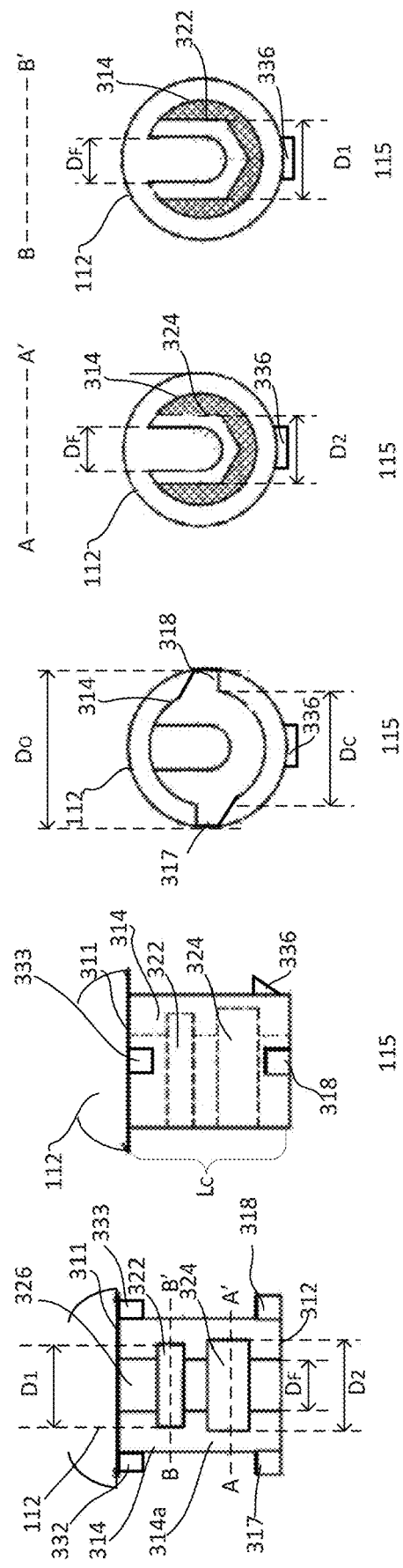

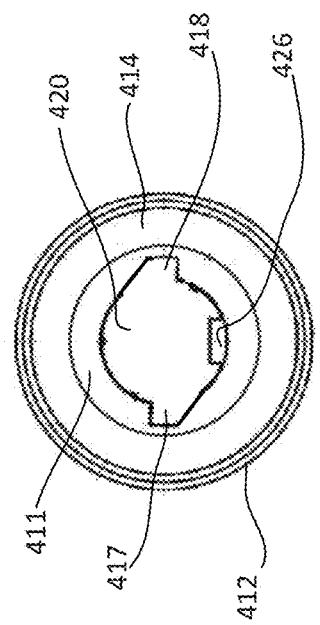
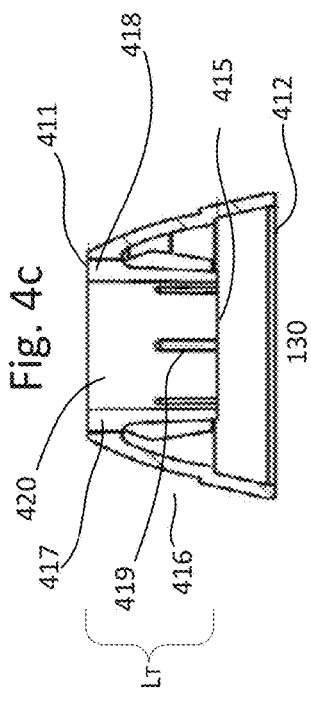
Fig. 4c
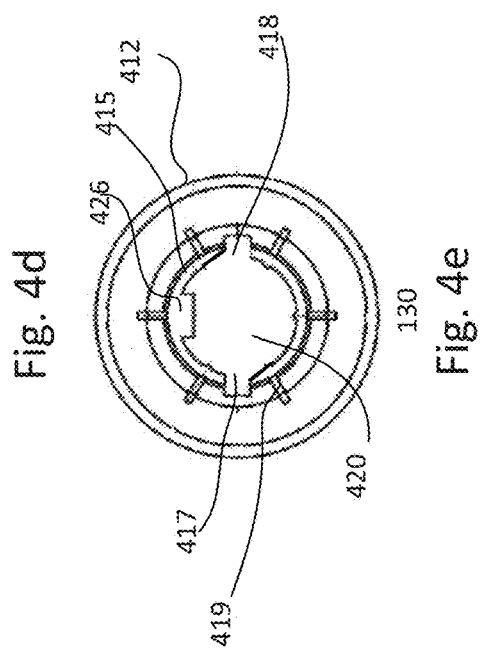
Fig. 4d
Fig. 4e
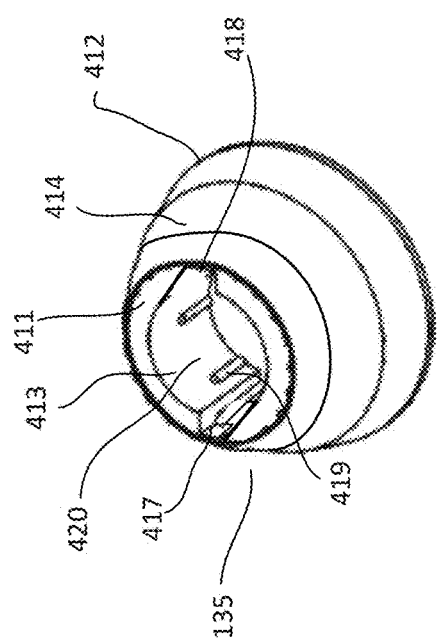
Fig. 4a
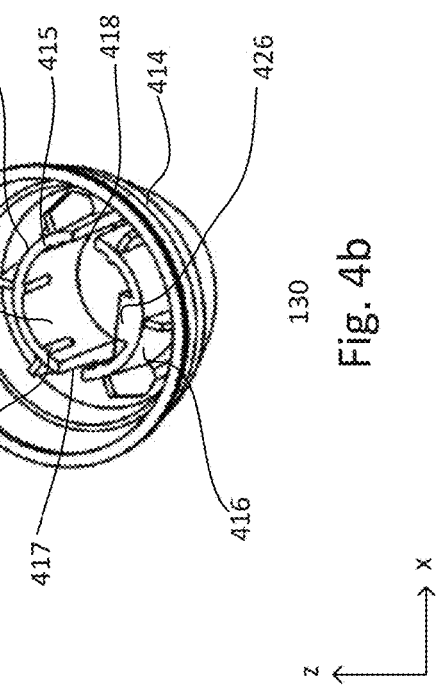
Fig. 4b

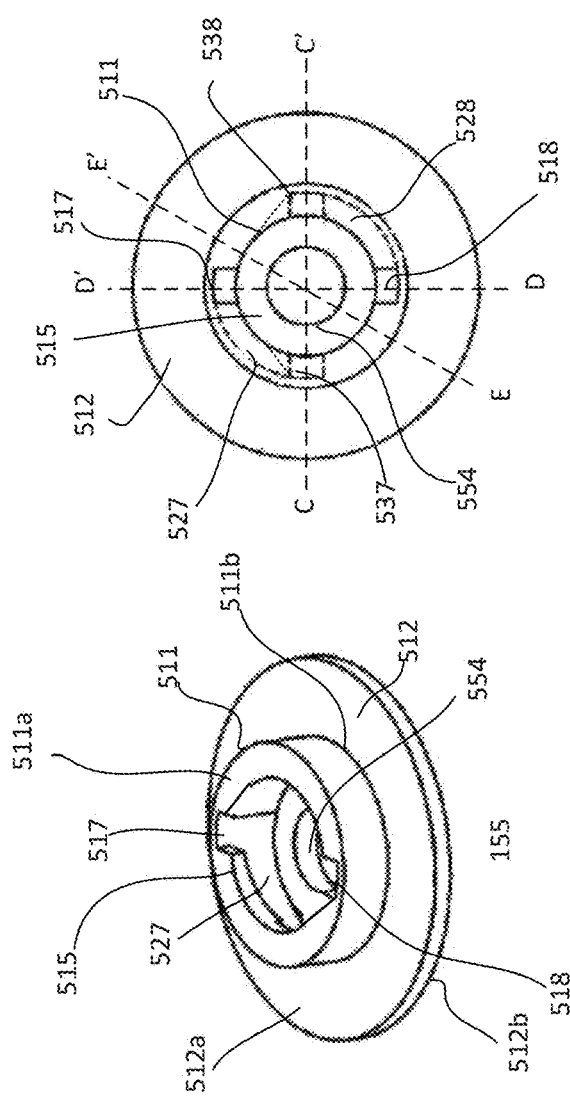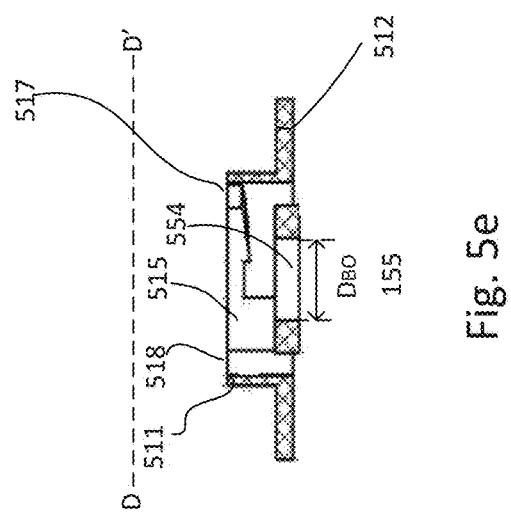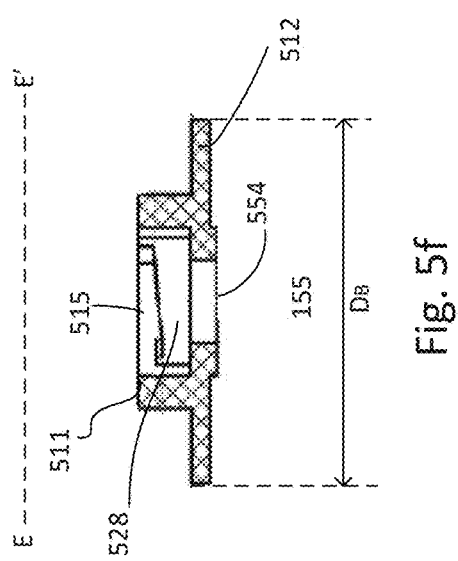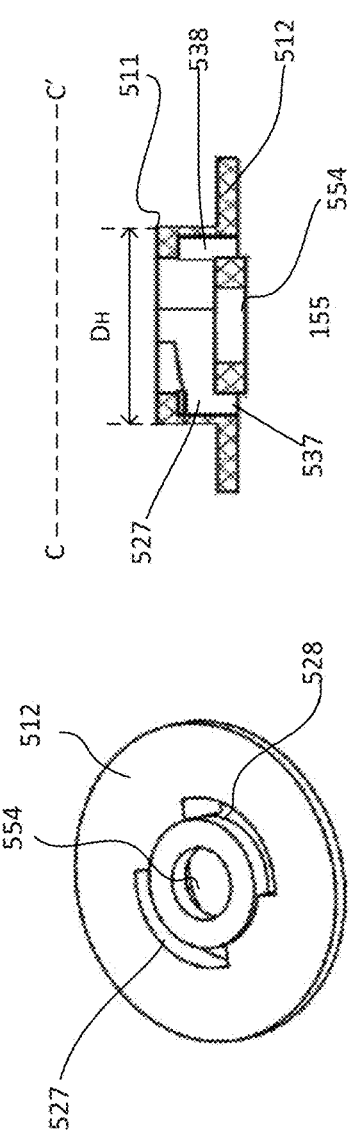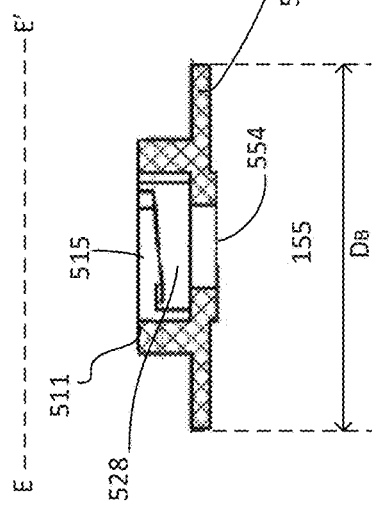

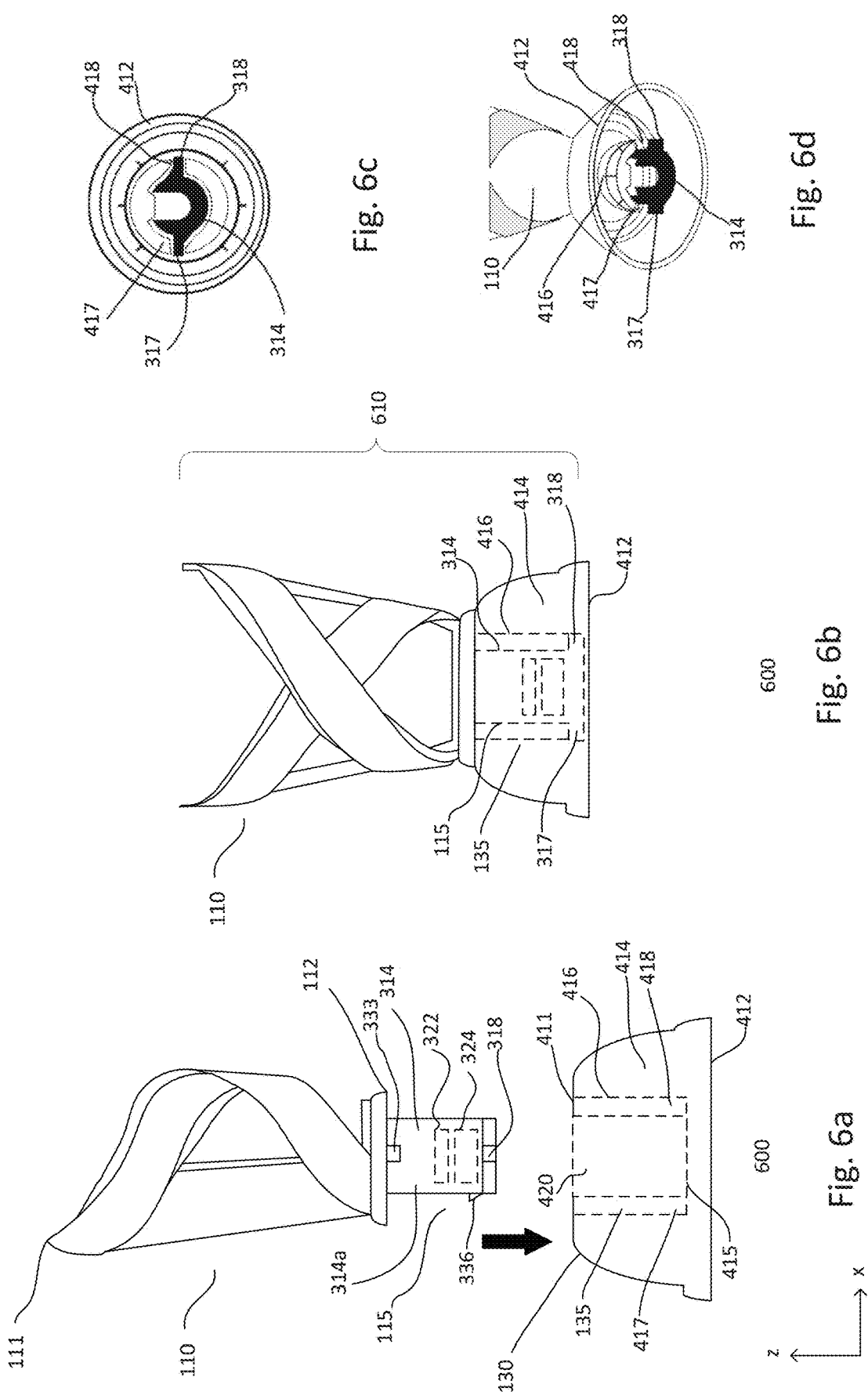

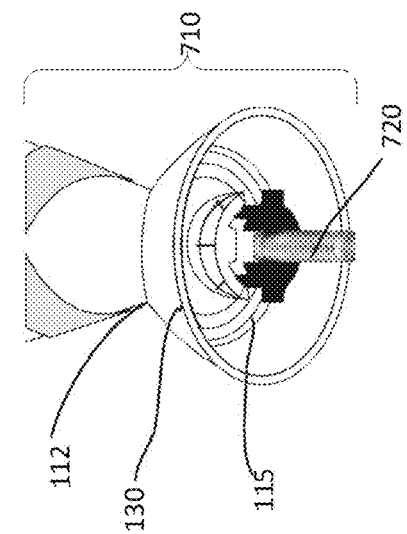
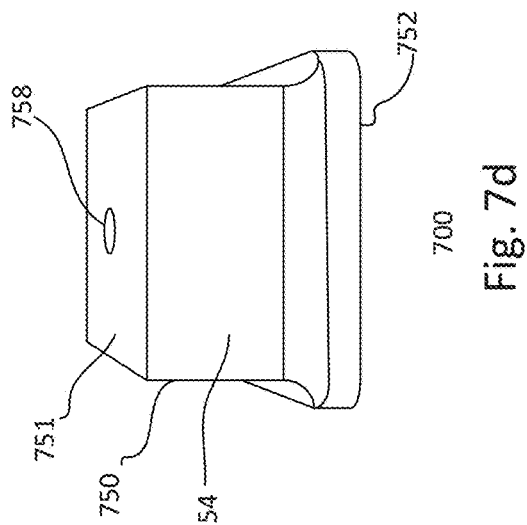
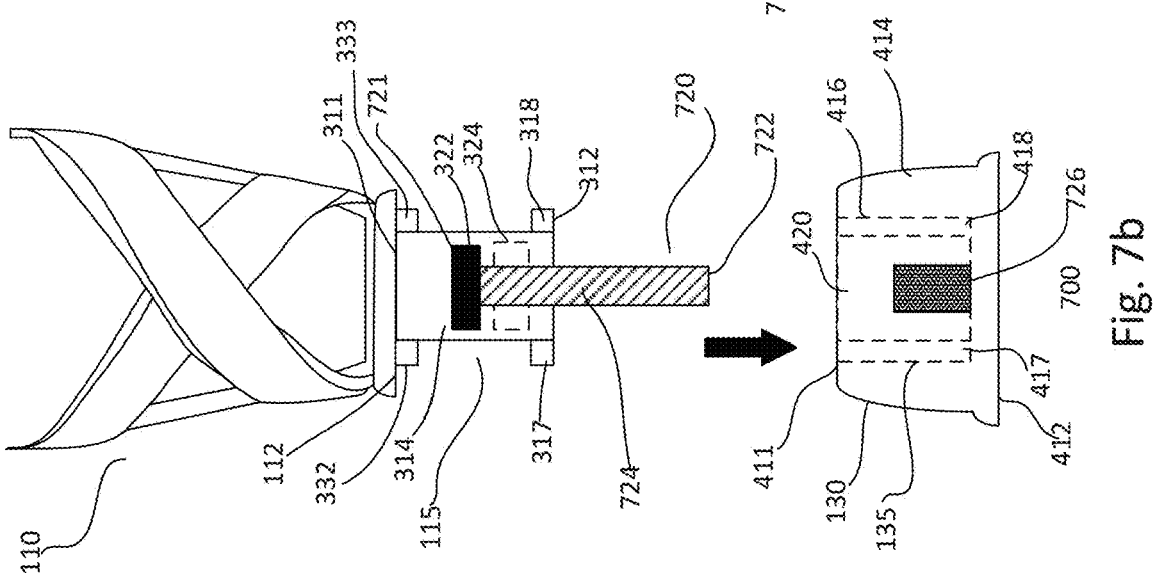
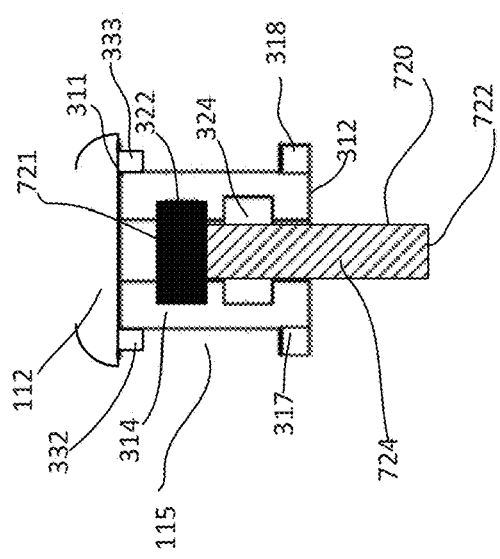
Fig. 7a
Fig. 7b
Fig. 7c
Fig. 7d

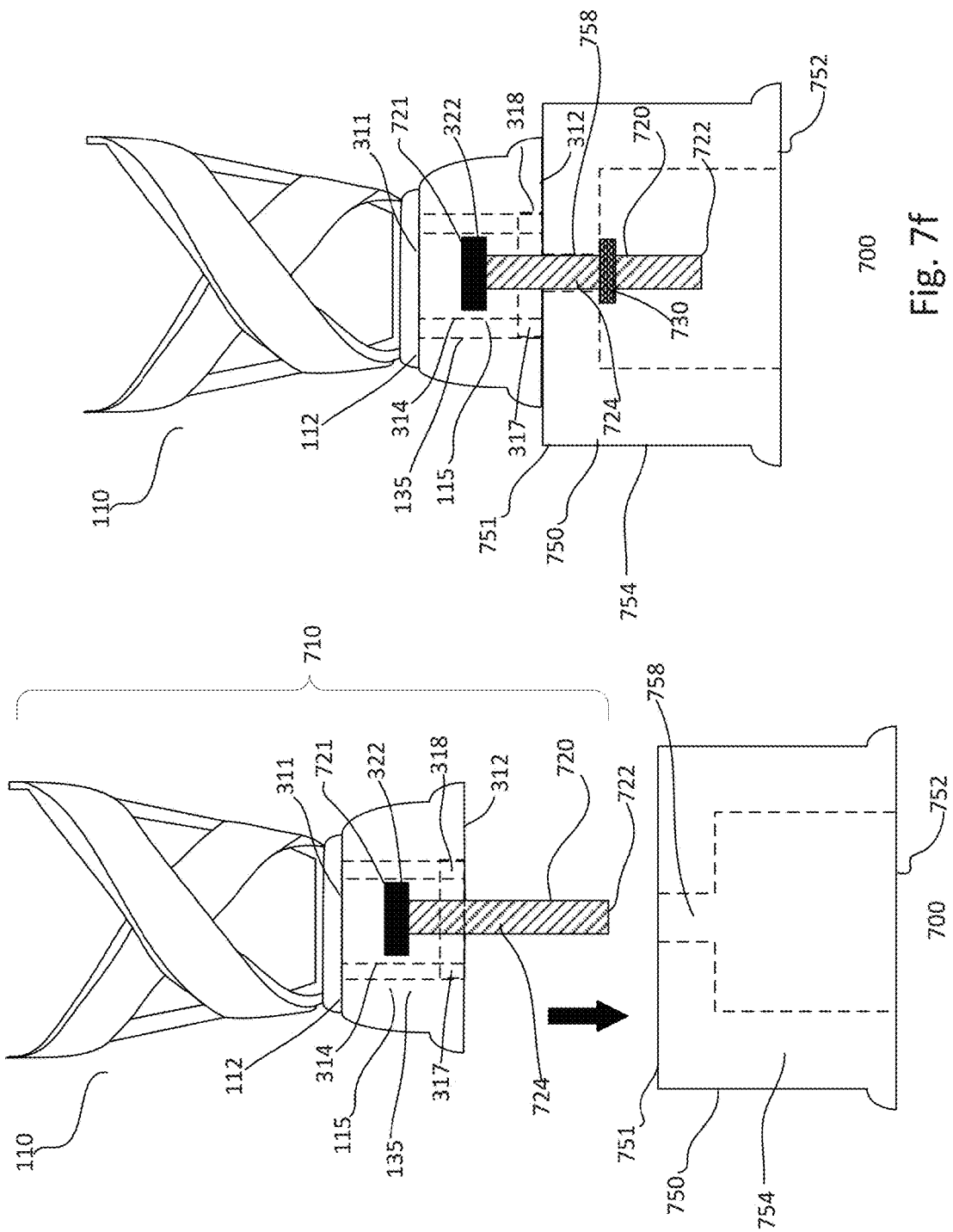

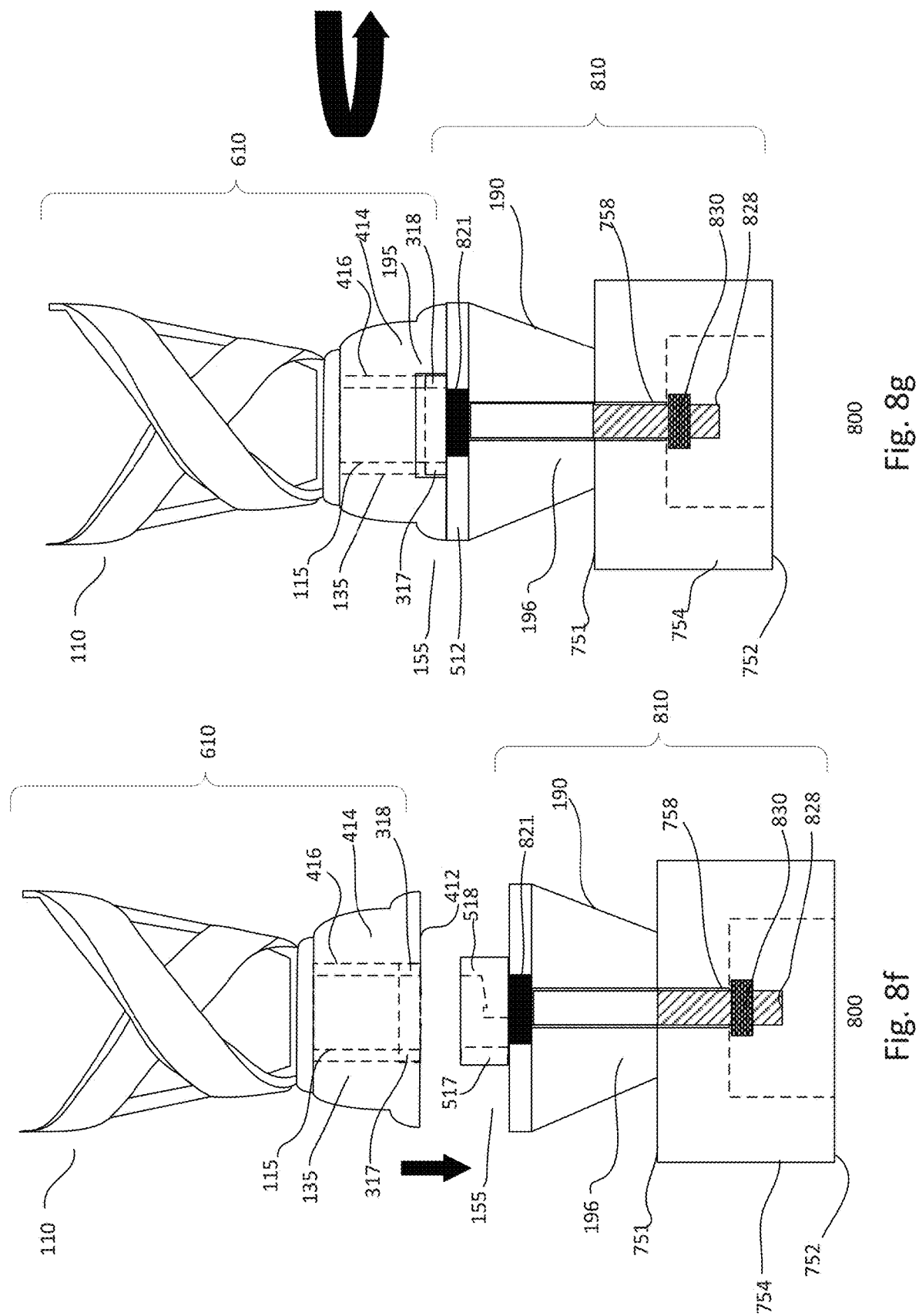

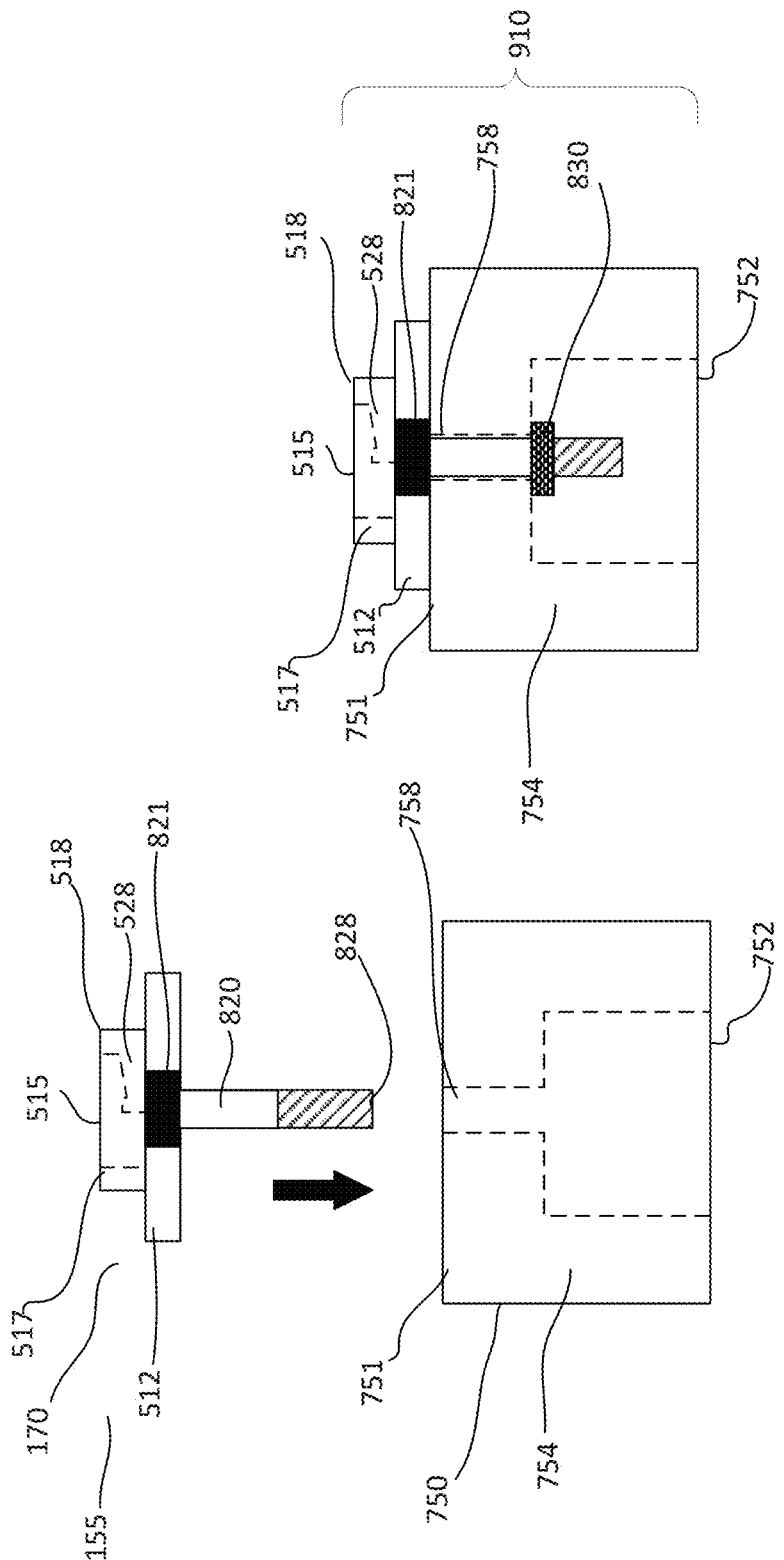

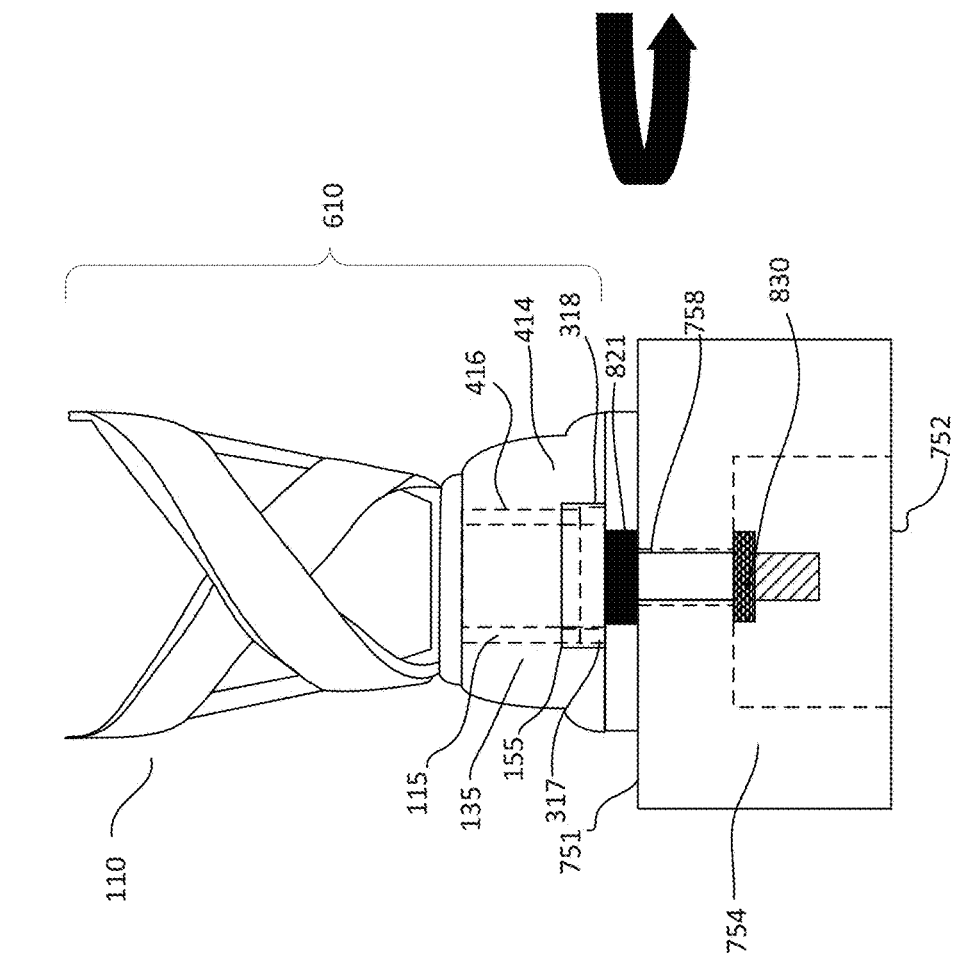
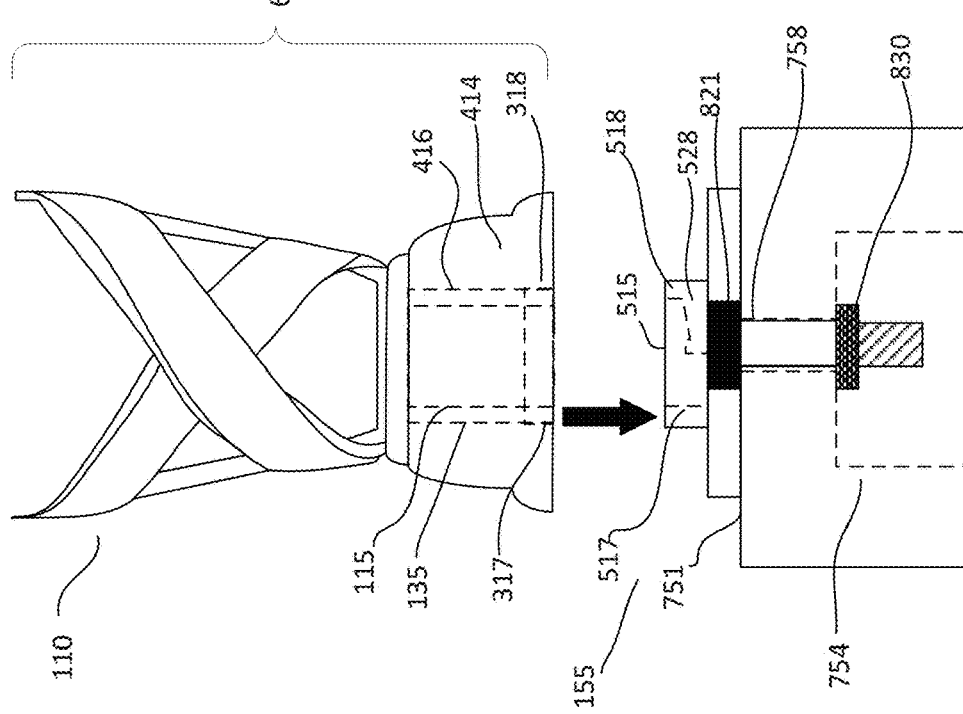

TROPHY ASSEMBLING SYSTEMS AND METHODS

CROSS-REFERENCE TO RELATED APPLICATION

This application is a continuation of U.S. patent application Ser. No. 15/459,000, filed on Mar. 15, 2017, which claims the benefit of U.S. Provisional Application Ser. No. 62/309,443, filed on Mar. 16, 2016 and Singapore (SG) Patent Application 10201605604T, filed on Jul. 8, 2016. The disclosure of all of which is hereby incorporated by reference in their entirety for all purposes.

BACKGROUND

A trophy generally includes an ornamental or a decorative figurine or structure adapted to be disposed upon a pedestal or riser which is affixed to a support base. The ornamental or decorative structure typically includes a three-dimensional representation which relates to a sport or activity pertaining to the trophy. The pedestal or riser is used to extend the height of the trophy while the support base is used to provide support to the ornamental or decorative structure and allows a trophy engraving plate to be attached thereto. The various components of the trophy are assembled together using various fastening mechanisms to form a trophy assembly. However, conventional trophy assembling methods are labor intensive and inefficient. In addition, conventional trophy assembling techniques require the use of various hardware which is not cost effective. Furthermore, once the various components of the trophy assembly are assembled using conventional techniques, the trophy assembly is generally fixed and is not easy to be disassembled into individual components thereafter. Thus, conventional assembling techniques are inflexible and does not allow user to mix and match any existing or new components of the trophy to be assembled and disassembled.

Based on the foregoing, there is a need to provide a trophy assembling technique which allows various components of the trophy to be assembled rapidly and easily and which offers flexibility to the user to mix and match any existing or new components of the trophy as desired by the user.

SUMMARY

Embodiments of the present disclosure generally relate to various fastening systems to assemble a trophy and methods of assembling a trophy. In one embodiment, a trophy assembly is disclosed. A trophy assembly includes a first trophy component with a first connector, a second trophy component with a second connector, and the first and second connectors are configured to engage in a reversible locking mechanism as male and female connectors to form the trophy assembly. The female connector includes grooves and each groove includes segments configured to receive flanges of the male connector and one of the segments ends with a slot configured to accommodate and maintain the flanges in a locked position.

In another embodiment, a method for assembling a trophy is presented. The method includes providing a first trophy component with a first connector, providing a second trophy component with a second connector, and the first and second connectors are configured to engage in a reversible locking mechanism as male and female connectors to form the trophy assembly. The female connector includes grooves and each groove includes segments configured to receive flanges of the male connector and one of the segments ends with a slot configured to accommodate and maintain the flanges in a locked position. The method further includes assembling the first and second trophy components by inserting the male connector into the female connector and twisting the components to cause the flanges of the male connector to be in the slots and locked into the locked position.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure. In the following description, various embodiments of the present disclosure are described with reference to the following drawings, in which:

FIGS. 3a-3e show various views of an embodiment of the male connector applied to the ornamental or decorative structure of FIGS. 2a-2d;

FIGS. 4a-4e show various views of an embodiment of a female connector which may be applied to a riser;

FIGS. 5a-5f shows various views of an embodiment of a female connector which may be applied to a support base, a decorative piece or a cap or coupling unit;

FIGS. 6a-6f show an embodiment of a method of assembling a trophy;

FIGS. 7a-7g show another embodiment of a method of assembling a trophy;

FIGS. 8a-8g show another embodiment of a method of assembling a trophy;

FIGS. 9a-9d show another embodiment of a method of assembling a trophy.

DETAILED DESCRIPTION

Embodiments of the present disclosure generally relate to various fastening systems to assemble a trophy and methods of assembling a trophy. For example, the fastening system utilizes a locking mechanism and/or a fastener to assemble a trophy. In one embodiment, the locking mechanism includes at least a male connector and a female connector. The male connector, for example, may be applied to a first component of the trophy while the female connector, for example, may be applied to a second component of the trophy. The male connector includes a first configuration which matches with a second configuration of the female connector. For example, when the male connector mates with the female connector, the male connector may be engaged with the female connector through a twisting motion or rotation to provide a secured connection between various components of the trophy. The fastening systems as will be described in this disclosure allow a user to mix and match new or existing components of trophy having various sizes and shapes to be easily and rapidly assembled together in a desired manner.

Figure 1:
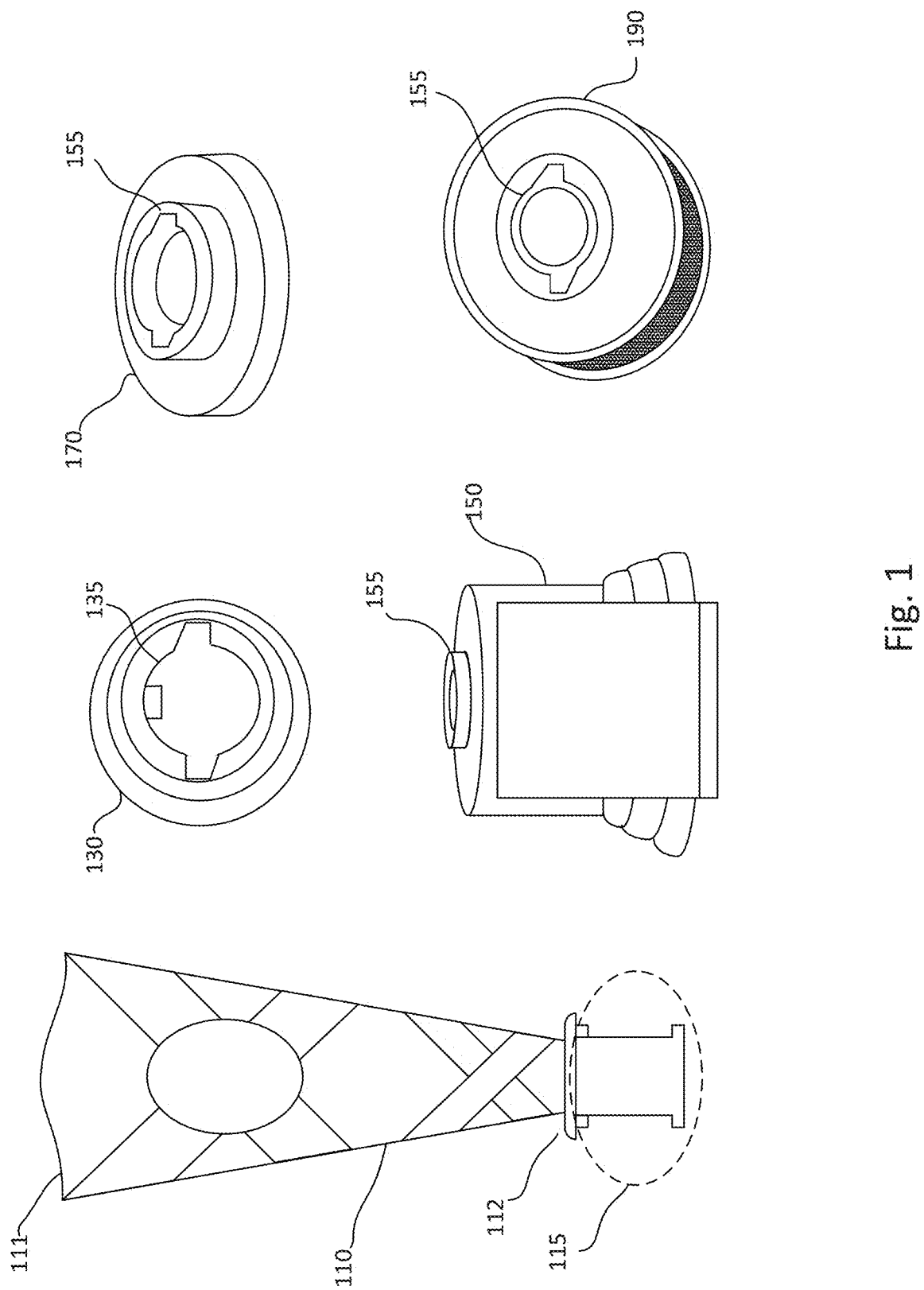
FIG. 1 shows examples of various components of a trophy that may utilize locking mechanism of the present disclosure.
Figure 2D:
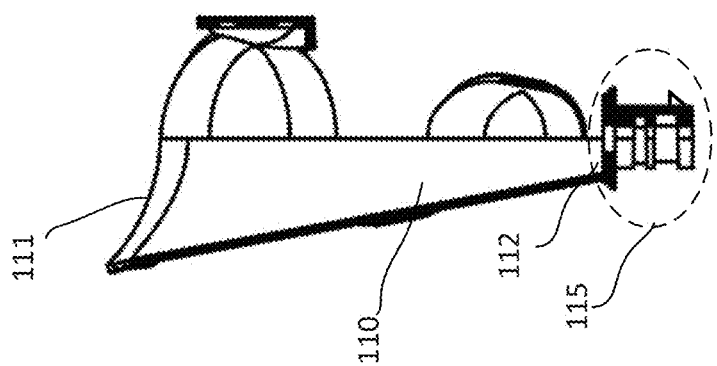
FIGS. 2a-2d show various views of an embodiment of an ornamental or decorative structure having a male connector.
Figure 2C:
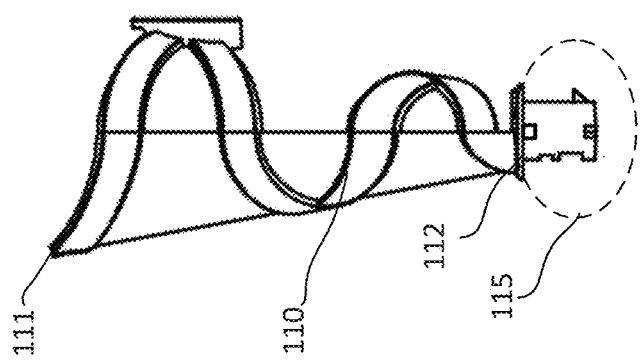
Figure 2B:
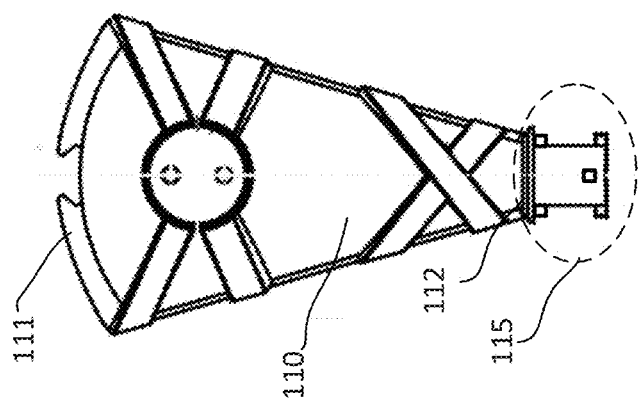
Figure 2A:
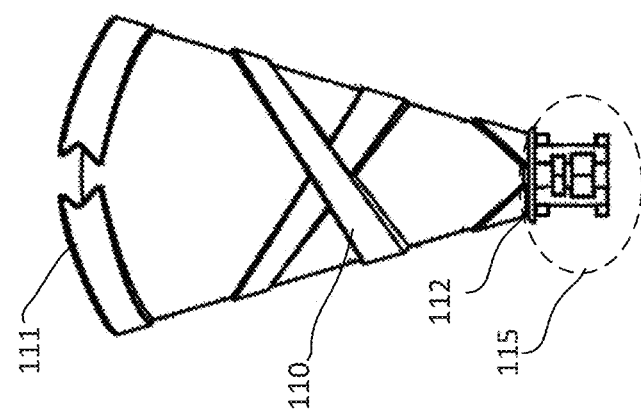

FIG. 1 shows examples of various components of a trophy assembly that may utilize the fastening system as will be described in later paragraphs of this disclosure. The trophy assembly includes an ornamental or decorative structure 110. The ornamental or decorative structure may include any suitable three-dimensional representations or designs in various forms or shapes as desired by the user. The trophy assembly generally further includes a pedestal or riser 130 and a support base 150. The pedestal or riser, for example, is used to extend the height of the trophy assembly while the support base is used to provide support to the ornamental or decorative structure and allows a trophy engraving plate to be attached thereto. In some embodiments, the trophy assembly may include a cap or coupling unit 170 or a decorative piece or element 190. The coupling unit or decorative piece may also be used to increase the height of the assembled trophy.

In one embodiment, a fastening system which includes a locking mechanism is used to assemble the various components of the trophy. The locking mechanism, in one embodiment, includes at least a male connector and a female connector. In one embodiment, a male connector 115 may be applied to the ornamental or decorative structure 110. On the other hand, a female connector (e.g., 135, 155), for example, may be applied to various suitable components of a trophy, including the riser 130, decorative piece 190, cap or coupling unit 170, support base 150, etc.

FIGS. 2a-2d show various views of an embodiment of an ornamental or decorative structure 110. The ornamental or decorative structure 110, for example, may also be referred to as topper or figure. The ornamental or decorative structure can be in various suitable sizes, shapes and appearances and can be made by any suitable materials as desired by the user. The ornamental structure, as shown, includes a first end 111 and a second end 112. The first end may be referred to as the top end while the second end may be referred to as the bottom end. The second end of the ornamental structure refers to the end portion of the ornamental structure which is proximal to the support base while the first end of the ornamental structure refers to the end portion distal from the support base for an assembled trophy.

In one embodiment, the second end 112 of the ornamental structure 110 is configured to include a male connector 115. The male connector, for example, is adapted to be selectively engaged with one or more female connectors of other components of the trophy assembly so that two or more components of the trophy can be assembled together. The male connector 115, for example, may be formed as part of the second end of the ornamental structure. Alternatively, the male connector 115 may be provided as a separate unit which can be attached to the second end of the ornamental structure.

FIGS. 3a-3e show various views of an example configuration of the male connector 115 which is applied to the ornamental or decorative structure 110 of FIG. 1 and FIGS. 2a-2d. FIG. 3a shows a front view, FIG. 3b shows a side view, FIG. 3c shows a bottom view while FIG. 3d and FIG. 3e are cross-sectional views of the male connector taken along A-A' and B-B' respectively. As shown, the male connector, for example, includes a column member 314. The column member, for example, is in the form of a cylindrically hollow tube having a first end 311, a second end 312, an outer surface and an inner surface. The column member may also be in the form of other suitable configurations or shapes. The first end 311 may be referred to as top end and the second end 312 may be referred to as the bottom end. The first end 311 of the column member is proximal to the second end 112 of the ornamental structure while the second end 312 of the column member is distal from the second end 112 of the ornamental structure. The column member includes an outer diameter $D_C$ which is smaller than the outer diameter $D_O$ of the second end 112 of the ornamental design. The body of the column member extends from the first end to the second end and is generally hollow. The body of the column member includes a length $L_C$ which extends from the first end 311 to the second end 312.

The column member includes a first flange 317 and a second flange 318 provided at the outer surface 314a and are positioned at the second end 312 of the column member. The first flange and the second flange are positioned at the second end of the column member such that the first flange and second flange are in diametric opposition with each other. The first and second flanges extend from the circumference of the body of the column member. As shown, the first flange and the second flange each has a first side surface which is connected to and extends horizontally (e.g., in the x-direction) from the circumference of the body of the column member and has a second side which is connected to and extends in a slanted manner from the circumference of the body of the column member. The outer edge of the first flange and the outer edge of the second flange, for example, are substantially parallel and aligned with the outer diameter of the second end of the ornamental design as shown in FIG. 3c. Alternatively, the outer edge of the first flange and the outer edge of the second flange may be defined such that they are within the outer diameter $D_O$ of the second end of the ornamental structure.

In some embodiments, the column member may include stopper elements provided at and connect to the outer surface of the column member. For example, first and second upper stopper elements 332 and 333 are positioned at the first end of the column member while a lower stopper element 336 is positioned nearer to the second end of the column member. The first upper stopper element 332 and the second upper stopper element 333 are positioned at the first end of the column member such that the first upper stopper element and second upper stopper element are in diametric opposition with each other. The first and second upper stopper elements are aligned and parallel to the first and second flanges. As for the lower stopper element, it may include a slanted sidewall profile.

In one embodiment, the column member may be defined with one or more slots for accommodating a fastener or a fastening element (not shown). The fastener may be any suitable types of fastener including bolt, screw, etc. The outer surface of the column member, for example, includes a first horizontal slot 322 and a second horizontal slot 324 which extend in the x-direction and a vertical slot 326 which extends from the second end 312 to the first end 311 and passes through the first and second horizontal slots. The first horizontal slot 322, for example, includes a diameter $D_1$ adapted to accommodate a fastener head of a first size while the second horizontal slot 324, for example, includes a diameter $D_2$ adapted to accommodate a fastener head of a second size. As shown, the second size may be slightly larger and thicker relative to the first size. As for the vertical slot 326, it includes a diameter $D_F$ which is substantially large to accommodate the shank or shaft of the fastener. The horizontal and vertical slots are configured such that the fastener may be inserted through the vertical slot and have its fastener head rests on the horizontal slot during assembly later.

In other embodiments, the outer surface 314a of the column member may not be defined with one or more slots. In such case, the outer surface of the column member includes a solid surface with no slots.

FIGS. 4a-4e show various views of an example configuration of a female connector 135 which is applied to the riser 130 of FIG. 1. FIGS. 4a and 4b show 3-dimensional views of the riser when viewed from top and bottom respectively, FIG. 4c shows the top view, FIG. 4d shows the cross-sectional view while FIG. 4e shows the bottom view of the riser. As described, the riser may be used to increase the height of the trophy assembly. As shown, the riser, for example, includes a first end 411 and a second end 412. The first end 411 may be referred to as top end and the second end 412 may be referred to as the bottom end. The first end 411 of the riser is proximal to the second end 112 of the ornamental structure 110 while the second end of the riser is distal from the second end of the ornamental structure during assembly. As an example, the riser includes a body 414 defined from the first end to the second end. In one example, the body of the riser is generally in the form of a conical-shaped structure. In such case, the first end 411 of the riser includes an outer diameter $D_{R1}$ which is substantially the same as the outer diameter $D_O$ of the second end 112 of the ornamental structure while the second end 412 of the riser includes an outer diameter $D_{R2}$ which is larger than the outer diameter of the second end of the ornamental structure. Other suitable configuration or shape of the riser may also be useful.

In one embodiment, the riser includes a female connector 135. The female connector 135, in one embodiment, is a columnar or tubular element 416 extending from the first end 411 towards the second end 412 of the riser. The tubular element, for example, is generally in the form of a cylindrical hollow tube having an inner surface 413, similar to the column member 314 described in FIG. 3a-3e. The tubular element includes a first end and a second end. The first end of the tubular element also corresponds to the first end 411 of the riser while the second end 415 of the tubular element is displaced away from the second end 412 of the riser. For example, the second end 415 of the tubular element is disposed above the second end 412 of the riser as shown in FIG. 4d.

The tubular element includes a first opening and a second opening defining a central cavity 420, a first guide rail 417 and a second guide rail 418. The first guide rail and the second guide rail are provided in the form of vertical grooves in communication with the central cavity. The first guide rail and the second guide rail are positioned such that the first guide rail and second guide rail are in diametric opposition with each other. The central cavity, the first guide rail and the second guide rail of the tubular element includes a configuration which matches the configuration of the male connector 115. For example, the central cavity, the first guide rail and the second guide rail of the tubular member are configured to receive the column member 314 of the male connector provided at the second end of the ornamental structure. In such case, the central cavity, the first and second guide rails are suitably sized or dimensioned to receive or accommodate the column member 314 having the first flange 317 and the second flange 318 and stopper elements (e.g., 332, 333 and 334). The body of the tubular element extends from the first end 411 to the second end 415 and includes a length $L_T$ which extends from the first end 411 to the second end 415. The length $L_T$, for example, is smaller than the length $L_C$ of the column member. In such case, during assembly, the central cavity receives the body of the column member, the first guide rail receives the first flange while the second guide rail of the tubular element receives the second flange which allow the column member to pass through and extend beyond the tubular element for connection to a support base.

In some embodiments where upper and lower stopper elements are provided, the central cavity receives the body of the column member, the first guide rail receives the first flange and the first upper stopper element while the second guide rail of the tubular element receives the second flange and the second upper stopper element which allow the column member to pass through and extend beyond the tubular member for connection to a support base. Thus, the upper stopper elements, for example, may be used to resist or prevent the first and second flanges from shifting in the left and right direction while the lower stopper element may be used to resist or prevent the first and second flanges from shifting in the forward and backward direction after insertion of the column member into the cavity of the tubular element.

The tubular element, for example, may optionally include a plurality of rib elements 419 disposed on the internal surface 413. The rib elements, for example, extend longitudinally from the second end 415 of the tubular element in the z-direction and are spaced apart from each other. The rib elements, for example, may be used to provide support and to strengthen the wall of the tubular element. In addition, the tubular element may optionally include a stopper element 426 defined on the second end of the tubular element. The stopper element 426 may be used to restrict or prevent over turning and to partially lock the male and female connectors 115 and 135 in position during assembly.

FIGS. 5a-5f show various views of an example configuration of a female connector 155 which may be applied to a component of a trophy including, but not limited to, the support base 150 or the decorative piece 190 of FIG. 1. In some embodiments, the female connector 155 may be provided in the form of a standalone cap or coupling unit 170 of FIG. 1. FIGS. 5a and 5b show 3-dimensional views of the female connector 155 when viewed from top and bottom respectively, FIG. 5c shows the top view while FIG. 5d, FIG. 5e and FIG. 5f show the cross-sectional views taken along C-C', D-D' and E-E' respectively. As shown, the female connector 155, for example, includes a housing member 511 and a base 512. The housing member 511, for example, is generally in the form of a cylindrical structure having a first end 511a, a second end 511b, an outer surface and an internal surface. The first end 511a may be referred to as top end and the second end 511b may be referred to as the bottom end. The first end 511a of the housing member is proximal to the second end 112 of the ornamental structure during assembly while the second end 511b of the housing member is coupled or connected to the base 512. As an example, the housing member includes a body defined between the first end and the second end. The first and second ends 511a-511b of the housing member includes an outer diameter $D_H$ which is substantially the same as the outer diameter $D_O$ of the second end 112 of the ornamental structure. Other suitable configuration or shape of the housing member may also be useful.

The housing member includes a first surface defined at the first end, a second surface defined at the second end, a central cavity 515, a first guide rail 517, a second guide rail 518, a first track 527 and a second track 528. The first guide rail and the second guide rail are provided in the form of vertical grooves in communication with the central cavity. The first guide rail and the second guide rail are positioned such that the first guide rail and second guide rail are in diametric opposition with each other. The central cavity, the first guide rail and the second guide rail of the housing member are configured to receive at least the lower portion of the column member 314 of the male connector provided at the second end of the ornamental structure. In such case, the central cavity, the first and second guide rails are suitably sized or dimensioned to receive or accommodate the column member 314. For example, the housing member is configured to receive the column member 314 of the ornamental structure through the central cavity 515 from the top end 511a to the top surface 512a of the base. The first guide rail 517 is configured to receive the first flange 317 and the second guide rail 517 is configured to receive the second flange 318 of the male connector.

The first track 527 and the second track 528 are radially positioned around the central cavity, where the first track and the second track are in diametric opposition from each other. The first track and the second track are circumferentially extending and formed in the circumferential inner sidewall of the housing member. The first track and the second track are oppositely positioned from each other when viewed from top as shown in FIG. 5c. The first track and the second track each includes a proximal end and a distal end. The proximal end of the first track is positioned adjacent and extends into the first guide rail 517 and the distal end 537 of the first track is oppositely positioned from the proximal end. Similarly, the proximal end of the second track is positioned adjacent and extends into the second guide rail 518 and the distal end 538 of the second track is oppositely positioned from the proximal end. The first and second tracks are provided in the form of horizontal grooves with tapered configuration having a wider opening at the proximal end and a narrower opening at the distal end. Such configuration provides locking of various components of the trophy when the first and second flanges are turned into a secured engagement position as will be described later so that the various components will not be dislodge. In one embodiment, the proximal end of the first track 527 is in communication with the first guide rail 517 while the proximal end of the second track 528 is in communication with the second guide rail 518.

The base 512, for example, is generally in the form of a cylindrical structure. For example, the base 512 includes a first surface 512a, a second surface 512b and a lateral surface positioned in between the top and bottom surfaces. The first surface 512a may be referred to as the top surface while the second surface 512b may be referred to as the bottom surface. The top surface 512a of the base is attached or connected to the second end 511b of the housing member while the bottom surface 512b is positioned away from the second end 511b of the housing member. The first and second surfaces of the base include an outer diameter $D_B$ which is larger than the outer diameter $D_H$ of the housing member. In the case where the female connector 155 is applied to a support base, such as applied as part of the top surface of the support base, the outer diameter of the base 513 may correspond to the outer diameter of the top surface of the support base. On the other hand, if the female connector is applied to a decorative piece, such as applied as part of the top surface of the decorative piece, the outer diameter of the base may correspond to the outer diameter of the top surface of the decorative piece. In the case where the female connector is provided as a standalone cap or coupling unit, such as applied over the top surface of a support base (e.g., a traditional support base), the outer diameter of the base may be smaller than the outer diameter of the support base.

In one embodiment, the base 512 of the female connector may be provided with an opening 554. The opening 554, as shown, extends through the first and second surfaces of the base. The opening 554, for example, is concentrically positioned within the central cavity 515 of the housing member. The opening is configured such that a fastener or a fastener element (not shown) may be inserted through the opening and have its fastener head rests within the opening during assembly later. The opening 554, for example, includes a diameter $D_{BO}$ adapted to accommodate a fastener head.

The appearance of the ornamental or decorative structure 110, the riser 130, the decorative piece 190, the coupling unit 170, the support base 150 as shown are for illustration purposes. It is understood that these components can be in various suitable designs or configurations. The various components of the trophy can be made of any suitable materials. For example, the ornamental structure and riser can be made of suitable materials including plastic, metal, etc. while the support base of the trophy can be made of suitable materials, including plastic, marble, wood, etc.

FIGS. 6a-6f show simplified drawings illustrating an embodiment of a method 600 of assembling a trophy. The method 600 may involve various components of the trophy which includes the locking mechanism employing the male connector and female connector as described in FIGS. 3a-3e, FIGS. 4a-4e and FIGS. 5a-5f. Thus, common features or features having the same reference numerals may not be described or described in detail.

Referring to FIG. 6a, an ornamental or decorative structure (also referred to as figure/topper) 110 similar to that shown in FIGS. 2a-2d is provided. For simplicity and illustration purpose, a lower portion of the ornamental or decorative structure 110 having the design as shown in FIGS. 2a-2d is illustrated in FIG. 6a. It is understood that the ornamental or decorative structure 110 can be in various suitable designs or configurations as desired by the user and can be made of any suitable materials, including plastic, metal, etc.

The ornamental or decorative structure 110 includes a first end and a second end 112. In one embodiment, the ornamental or decorative structure is configured with a male connector 115. The male connector 115 is the same as the male connector 115 as described and shown with respect to FIGS. 3a-3e. For example, the male connector includes a column member 314 having a first flange 317 and a second flange 318 provided at the second end of the column member. In some embodiments, the column member of the male connector may also include the upper and lower stopper elements. As shown, the column member includes an outer surface 314a that may be defined with one or more slots (e.g., 322, 324) for accommodating a fastener or a fastener element (not shown). It is understood that the outer surface of the column member may not be defined with one or more slots.

As shown, a riser 130 is provided. The riser, in one embodiment, includes a female connector 135 as described and shown in FIGS. 4a-4e. For example, the female connector 135 includes a columnar or tubular element 416 extending from the first end 411 towards the second end 412 of the riser. The tubular element, for example, includes a central cavity 420, first guide rail 417 and second guide rail 418.

The method 600 continues to join the male connector of the ornamental structure 110 with the female connector of the riser to form a first partially assembled unit 610 as shown in FIG. 6b. To properly engage the male connector to the female connector, the column member of the male connector is aligned with the central cavity of the female connector, the first flange is aligned with the first guide rail while the second flange is aligned with the second guide rail of the riser. To join the male connector of the ornamental structure with the female connector of the riser, the first flange and the second flange of the male connector are inserted through the first guide rail and the second guide rail respectively while the column member passes through the central cavity of the riser. Once the male connector is inserted through the female connector, the first partially assembled unit 610 is formed. At this stage, the male connector is loosely held or engaged with the female connector as shown in FIG. 6c where the male connector may still be moveable in the z-direction. In some embodiments where the male connector is provided with upper and lower stopper elements, the upper stopper elements may resist or prevent the first and second flanges from shifting in the left and right direction while the lower stopper element may resist or prevent the first and second flanges from shifting in the forward and backward direction after insertion of the column member into the cavity of the tubular element. As described, the body of the tubular element includes a length $L_T$ which is smaller than the length $L_C$ of the column member. Thus, when the male connector is inserted into the female connector, a lower portion of the column member with the first and second flanges at the second end of the column member are exposed and extend beyond the second end of the tubular element as shown in FIG. 6d.

Figure 6E:
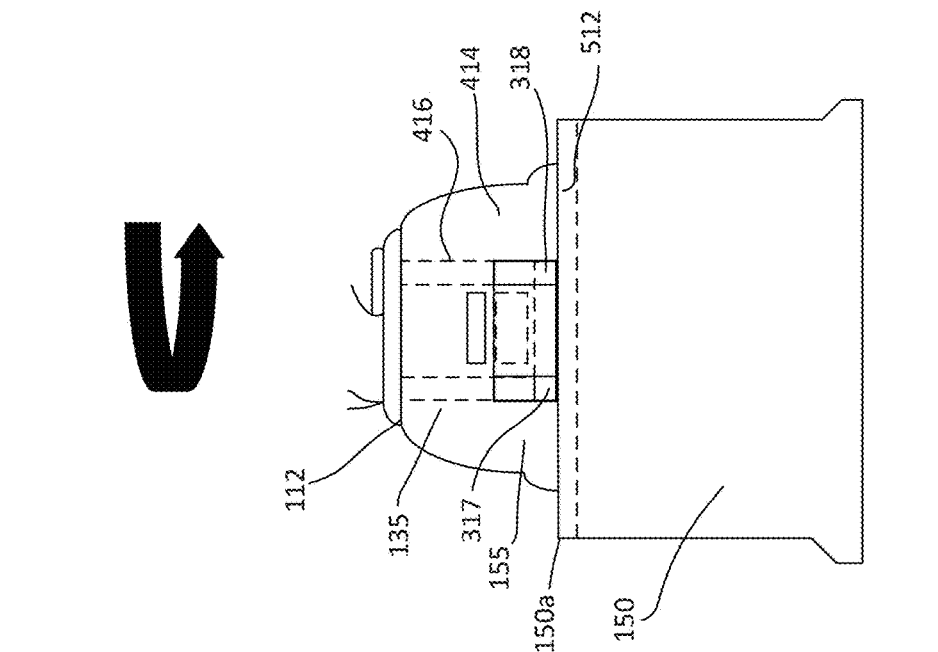

Referring to FIG. 6e, a support base 150 is provided. The support base, in one embodiment, includes a female connector 155 as described in FIGS. 5a-5f being adapted or integrated as part of the top surface of the support base. In such case, the base 512 of the female connector 155 corresponds to the top surface 150a of the support base 150 while the housing member 511 extends beyond the top surface 150a of the support base as shown in FIG. 6e. The housing member, for example, includes a first surface defined at the first end, a second surface defined at the second end, a central cavity 515, a first guide rail 517, a second guide rail 518, a first track 527 and a second track 528 as described in FIGS. 5a-5f.

The method 600 continues to engage the first partially assembled unit 610 with the female connector 155 which is adapted as part of the top portion of the support base 150. To join the extended portion of the male connector of the first partially assembled unit 610 and the female connector 155, the first flange 317 is engaged with the first track 527 through the first guide rail 517, while the second flange 318 is engaged with the second track 528 through the second guide rail 517. To properly position the extended portion of the male connector 115 with respect to the female connector 155, the first flange 317 is aligned with the first guide rail 517 and the second flange 318 is aligned with the second guide rail 518 of the housing member. Once the male connector 115 is inserted into the female connector 155 through the first guide rail 517 and the second guide rail 518, the first flange 317 and the second flange 318 can be respectively moved in between the proximal end and the distal end of the first track 527 and the second track 528. Thus, the male connector is able to move in between a first unsecured configuration and a second secured configuration.

Figure 6F:
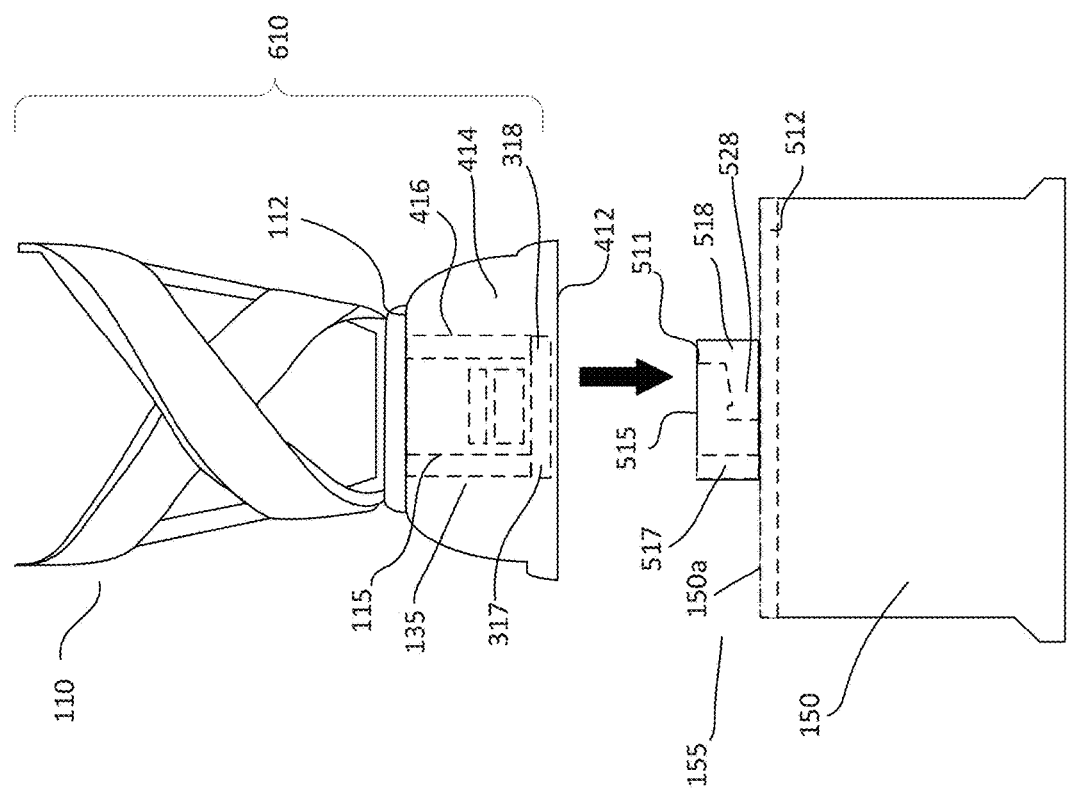

When the male connector is inserted into the female connector, the first partially assembled unit is positioned in the first unsecured configuration. For example, the extended portion of the male connector 115 of the first partially assembled unit 610 is considered to be in the first unsecured configuration when the first flange 317 is positioned adjacent to the proximal end of the first track 527 and the second flange 318 is positioned adjacent with the proximal end of the second track 528. The unsecured configuration allows the first partially assembled unit to easily separate the male connector and the female connector apart from each other. When the first partially assembled unit is fitted to the support base, the extended portion of the first male connector of the ornamental or decorative structure is securely engaged with the second female connector of the base through a twisting motion to form an assembled trophy. For example, the extended portion of the male connector 115 of the first partially assembled unit 610 is considered to be in the second secured configuration when the first flange 317 is moved and positioned adjacent to the distal end 537 of the first track 527 and the second flange 318 is moved and positioned adjacent to the distal end 538 of the second track. The secured configuration prevents the separation of the male connector and the female connector apart from each other, providing a secured connection in between the various components of the trophy. For instance, the various components of the trophy are securely engaged and assembled by twisting in a first direction. The first direction, for example, may be an anticlockwise direction as illustrated in FIG. 6f. Alternatively, the first direction may be a clockwise direction. This completes the assembling of the various components of the trophy to form a trophy assembly as shown in FIG. 6f When the first partially assembled unit and the support base need to be detached from each other, the male connector is rotated in a second direction to the unsecured configuration from the secured configuration. The second direction, for example, is in the direction opposite to the first direction. To unlock the various components of the assembled trophy, the first flange is moved from the distal end to the proximal end of the first track while the second flange is moved from the distal end to the proximal end of the second track and then releasing itself from the female connector through the first and second guide rails.

As illustrated in FIGS. 6a-6f, the various components of the trophy can be easily and rapidly assembled using the locking mechanism which employs the male connector and one or more female connectors. The male connector and the female connectors may be engaged with each other through a twisting motion or rotation without utilizing any fastener or fastener element, such as screw, nuts, bolts, etc.

FIGS. 7a-7e show simplified drawings illustrating another embodiment of a method 700 of assembling a trophy. The method 700 may be similar to the method 600 as described in FIGS. 6a-6f and may involve various components of the trophy having the male connector and female connector as described in FIGS. 3a-3e and FIGS. 4a-4e. Thus, common method steps, common features or features having the same reference numerals may not be described or described in detail.

Referring to FIG. 7a, an ornamental or decorative structure 110 is provided. For simplicity and illustration purpose, a lower portion of the ornamental or decorative structure 110 having the design as shown in FIGS. 2a-2e is illustrated in FIG. 7a. In one embodiment, the ornamental or decorative structure is configured with a male connector 115. The male connector 115 is the same as the male connector as described with respect to FIGS. 3a-3e. For example, the male connector 115 includes a column member 314 having a first flange 317 and a second flange 318 provided at the second end of the column member. As shown, the column member includes an outer surface 314a that may be defined with one or more slots for accommodating a first fastener or a first fastener element. For example, the outer surface of the column member includes a first horizontal slot 322 and a second horizontal slot 324 which extend in the x-direction and a vertical slot 326 which extends from the second end 312 to the first end 311 and passes through the first and second horizontal slots.

The method continues to provide a first fastener element 720. The first fastener element 720 may be any suitable types of fastener including bolt, screw, etc. In one embodiment, the first horizontal slot 322 is configured in a size sufficiently large to accommodate a fastener head 721 of the first fastener element. In such case, the first fastener element 720 is inserted through the vertical slot and have its fastener head 721 rests on the first horizontal slot 322 while threaded shank or shaft 724 of the first fastener element passes through the vertical slot having its lower portion extending beyond the second end 312 of the male connector as shown in FIG. 7a. By way of an example, the first fastener element 720 is a bolt. As shown, the bolt is inserted through the vertical slot and the bolt head rests on the first horizontal slot. As shown, the lower threaded portion of the bolt extends beyond the second end of the male connector.

In other embodiments, the second horizontal slot 324 is configured in a size sufficiently large to accommodate the fastener head of the first fastener element. In such case, the first fastener element may be inserted through the vertical slot and have its fastener head rests on the second horizontal slot. Inserting the first fastener element to the first or second horizontal slot depends on the size of the slot.

Referring to FIG. 7b, a riser 130 is provided. The riser, in one embodiment, includes a female connector 135 as described and shown in FIGS. 4a-4e. For example, the female connector 135 includes a columnar or tubular element 416 extending from the first end 411 towards the second end 412 of the riser. The tubular element, for example, includes a central cavity 420, first guide rail 417 and second guide rail 418 suitably sized or dimensioned to receive the male connector having the column member with first flange and second flange. In one embodiment, the riser may include a stopper element 726 which assists in directing the lower portion of the first fastener element through the female connector of the riser. The stopper element 726 may prevent the top of the fastener element from moving forward and backward.

The method 700 continues to join the male connector 115 of the ornamental structure 110 having the first fastener element 720 inserted therein with the female connector 135 of the riser to form a first partially assembled unit 710 as shown in FIG. 7c. To properly engage the male connector having the first fastener element inserted therein to the female connector, the column member 314 is aligned with the central cavity 420, the first flange 317 is aligned with the first guide rail 417, the second flange 318 is aligned with the second guide rail 418 of the riser while the stopper element guides the lower portion of the first fastener element through the central cavity. To join the male connector of the ornamental structure with the female connector of the riser, the first flange and the second flange of the male connector are inserted through the first guide rail and the second guide rail respectively while the column member with the fastener therein pass through the central cavity of the riser. Once the male connector with the fastener is inserted through the female connector, the first partially assembled unit 710 is formed. At this stage, the male connector is loosely held by the female connector as shown in FIG. 7c where the male connector with the fastener may still be moveable in the z-direction. As described, the body of the tubular element of the female connector includes a length $L_T$ which is smaller than the length $L_C$ of the column member of the male connector. Thus, when the male connector with the fastener is inserted into the female connector, a lower portion of the column member with the first and second flanges at the second end of the column member as well as the lower portion of the threaded shank of the first fastener element are exposed and extend beyond the second end of the tubular element as shown in FIG. 7c.

Referring to FIG. 7d, a support base 750 is provided. The support base, in one embodiment, is a traditional support base. The traditional support base 750, for example, can be made of plastic, marble, wood and other suitable form of support pedestal. The traditional support base, in one embodiment, includes a first surface 751, a second surface 752 and lateral surfaces 754 in between the first and second surfaces forming the body of the support base 750. The first surface 751 may be referred to as the top surface while the second surface 752 may be referred to as the bottom surface. In one embodiment, the top and bottom surfaces are substantially planar. The top surface 751, in one embodiment, includes an opening or bore 758. The opening 758, for example, is positioned at about the centre of the top surface 751 of the support base and has a size which is sufficiently large to accommodate the threaded shank 724 of the first fastener element.

The method 700 continues to engage the first partially assembled unit 710 with the support base 750. To join the first partially assembled unit 710 and the support base 750, the exposed lower portion of the threaded shank 724 of the first fastener element is inserted through the opening 758 as shown in FIG. 7e. To properly position the first partially assembled unit with respect to the support base, the lower portion of the threaded shank is aligned with the opening 758. Once the lower portion of the threaded shank 724 of the first fastener element is inserted into the opening 758, the extended portion of the male connector rests on top of the top surface 751 of the support base which is substantially planar. As shown, the extended portion of the male connector having the column member with first flange and second flange rest on top of the top surface of the support base. At this stage, the first partially assembled unit 710 is in an unsecured configuration as it is still moveable in the z-direction.

Referring to FIG. 7f, the method 700 continues by providing a second fastener element 730. The second fastener element, for example, includes a configuration which is engageable with and complements the configuration of the first fastener element. By way of an example, the second fastener element 730 includes a nut. The nut, for example, is a hexagonally shaped nut and has a nut body with internal threading for threading on lower portion of the threaded shank of the first fastener element. Other suitably shaped nuts, including wing shaped nut, may also be useful. Thus, after the threaded shank of the first fastener element is inserted into the opening and the second fastener element is drawn up by rotating in the first direction, the support base 750 is securely engaged with the first partially assembled unit 710. The first direction, for example, may be a clockwise direction. Such secured configuration prevents the separation of the male connector and the female connector apart from each other, providing a secured connection in between the various components of the trophy. This completes the assembling of the various components of the trophy to form a trophy assembly as shown in FIG. 7f. The bottom view of the second fastener element securely engaging with the threaded shank of the first fastener element is illustrated in FIG. 7g. When the partially assembled unit and the support base need to be separated or detached from each other, the second fastener element is rotated in a second direction opposite to the first direction. The second direction, for example, may be an anti-clockwise direction. This, for example, allows the assembled trophy to change from the secured configuration to the unsecured configuration.

As illustrated in FIGS. 7a-7g, the various components of the trophy can be easily and rapidly assembled using the locking mechanism which employs the male connector and one or more female connectors. The male connector and the female connector may be connected with each other and may be securely engaged with a traditional support base through suitable fastener or fastener element, such as screw, nuts, bolts, etc. This allows user to mix and match various components of trophy which minimizes inventory.

FIGS. 8a-8g show simplified drawings illustrating another embodiment of a method 800 of assembling a trophy. The method 800 may be similar to the method 600 as described in FIGS. 6a-6f or method 700 as described in FIGS. 7a-7g and may involve various components of the trophy having the male connector and female connector as described in FIGS. 3a-3e, FIGS. 4a-4e and FIGS. 5a-5f. Thus, common method steps, common features or features having the same reference numerals may not be described or described in detail.

Figure 8C:
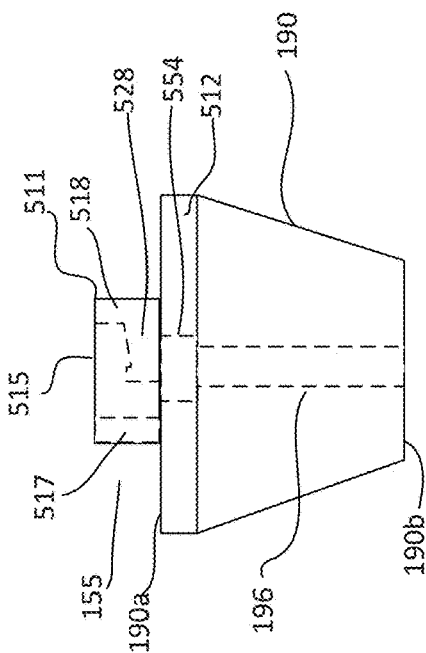
Figure 8B:
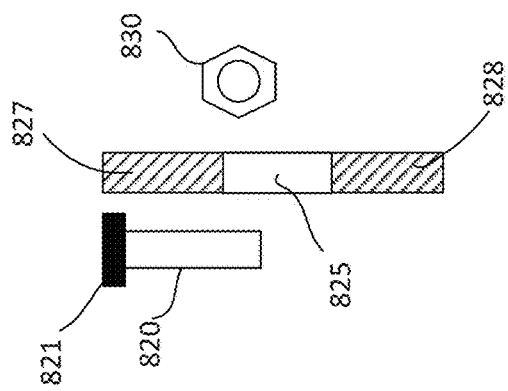
Figure 8A:
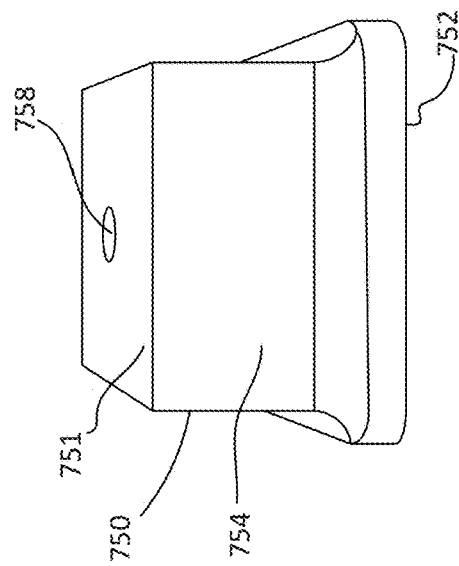

Referring to FIG. 8a, a support base 750 is provided. The support base, in one embodiment, is a traditional support base and include the same features as described in FIG. 7d. For example, the support base 750 includes top and bottom surfaces 751 and 752 which are substantially planar and includes an opening or bore 758 having a size which is sufficiently large to accommodate a fastener or fastener element as will be described later.

For illustration purpose, first, second and third fastener elements are provided as shown in FIG. 8b. The first fastener element, for example, includes a washer 820 with a washer head 821 and internal thread, the second fastener element 825 includes a rod having first and second threaded end portions 827 and 828 while the third fastener element includes a nut 830 similar to the nut 730 as described in FIG. 7f.

Referring to FIG. 8c, a decorative piece 190 is provided. The decorative piece 190, in one embodiment, includes a female connector 155 as described in FIGS. 5a-5f being adapted or integrated as part of the top surface 190a of the decorative piece. In such case, the base 512 of the female connector 155 corresponds to the top surface 190a of the decorative piece while the housing member 511 extends beyond the top surface 190a of the decorative piece as shown in FIG. 8c. The housing member, for example, includes a first surface 511a defined at the first end, a second surface 511b defined at the second end, a central cavity 515, a first guide rail 517, a second guide rail 518, a first track 527 and a second track 528 as described in FIGS. 5a-5f. In one embodiment, the housing member also includes an opening 554 which extends through the first and second surfaces of the base 512. The opening 554, for example, is concentrically positioned within the central cavity 515 of the housing member. Further, the decorative piece 190 is also configured to include a through hole 196 which extends from the bottom surface of the base 512 to the bottom surface 190b of the decorative piece. The through hole 196, for example, is in communication with the opening 554 to accommodate portions of the first and second fastener elements as will be described later.

The method 800 continues to join the first and second fastening elements. For example, the second fastener element 825 (e.g., rod) having top threaded end 527 is drawn up by rotating in a first direction to be securely engaged with the internal thread of the first fastener element 820 (e.g., washer). As shown, this leaves the bottom threaded end 828 of the second fastener element exposed. The method continues by inserting the first and second fastener elements into the decorative piece 190 through the central cavity 515 of the housing member 511. At this stage, the secured first and second fastener components pass through the central cavity 515, the opening 554 and the through hole 196, leaving the bottom threaded end 528 of the second fastener element exposed and extends beyond the bottom surface 190b of the decorative piece. As shown in FIG. 8d, the head 821 of the first fastener element 820 rests within the opening 554 of the base 512.

The method 800 continues to engage the decorative piece 190 with the support base 750 to form a partially assembled unit. The partially assembled unit may be referred to as a second or bottom partially assembled unit 810. To join the decorative piece 190 having the female connector 155 with the support base 750, the exposed bottom threaded end 828 of the second fastener element is inserted through the opening 758 as shown in FIG. 8d. To properly position the decorative piece with respect to the support base, the exposed bottom threaded end of the second fastener element is aligned with the opening 758. Once the bottom threaded end is inserted into the opening, the decorative piece 190 rests on top of the top surface 751 of the support base which is substantially planar. At this stage, the decorative piece is in an unsecured configuration as it is still moveable in the z-direction.

Figure 8E:
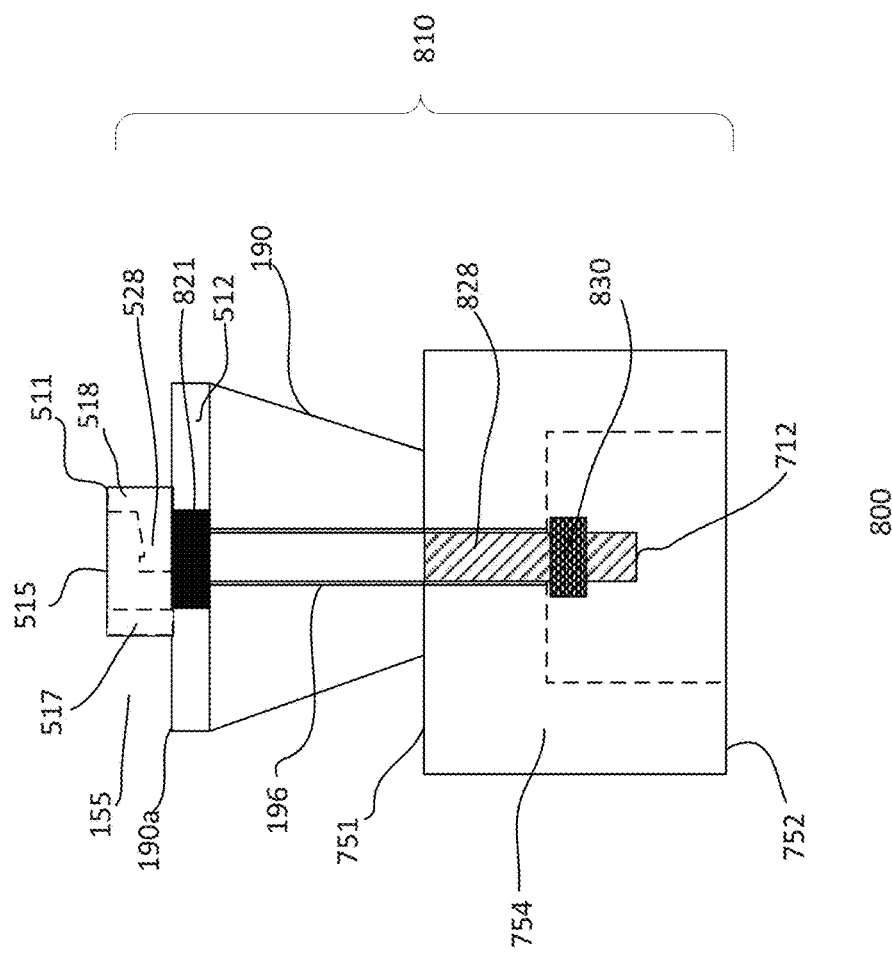
Figure 8D:
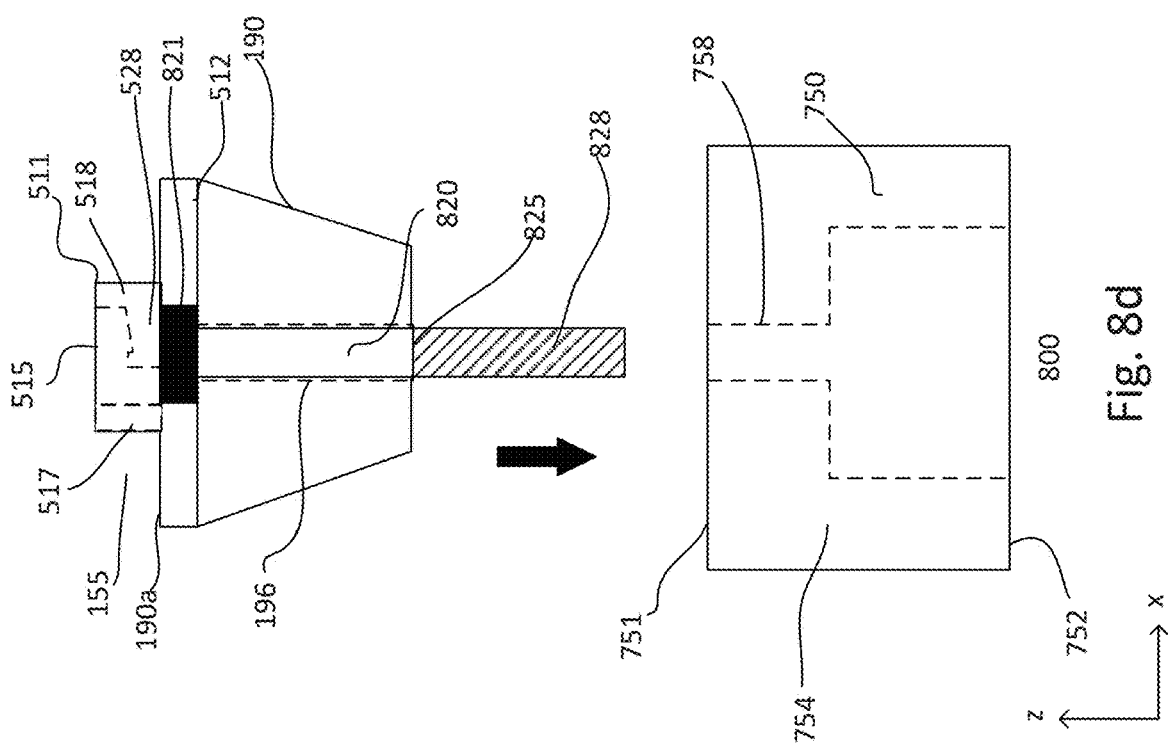

Referring to FIG. 8e, the method 800 continues by providing the third fastener element 830 (e.g., nut). Thus, after the bottom threaded end of the second fastener element is inserted into the opening of the support base and the third fastener element is drawn up by rotating in the first direction, the support base is securely engaged with the decorative piece. The first direction, for example, may be a clock-wise direction. Such secured configuration prevents the separation of the decorative piece and the support base apart from each other, providing a secured connection in between the support base and the decorative piece. This completes the formation of the second or bottom partially assembled unit 810 as shown in FIG. 8e. When the decorative piece and the support base need to be separated from each other, the third fastener element is rotated in a second direction opposite to the first direction. The second direction, for example, may be an anti-clockwise direction. This, for example, allows the partially assembled unit to change from the secured configuration to the unsecured configuration.

The method 800 continues by providing the first partially assembled unit 610. The first partially assembled unit 610 is the same as that described and shown in FIG. 6b and is formed by techniques as described in FIGS. 6a-6b. Thus, such details will not be repeated herein. Referring to FIG. 8f, to join the first partially assembled unit and the second partially assembled unit, the first flange 317 of the male connector is engaged with the first track 527 through the first guide rail 517 of the female connector, and the second flange 318 of the male connector is engaged with the second track 528 through the second guide rail 517 of the female connector. To properly position the extended portion of the male connector of the first partially assembled unit 610 with respect to the female connector of the second partially assembled unit 810, the first flange 317 is aligned with the first guide rail 517 and the second flange 318 is aligned with the second guide rail 518. Once the male connector 115 is inserted into the female connector 155 as part of the decorative piece through the first guide rail 517 and the second guide rail 518, the first flange and the second flange can be respectively moved in between the proximal end and the distal end of the first track 527 and the second track 528. Thus, the male connector 115 is able to move in between a first unsecured configuration and a second secured configuration.

When the male connector is inserted into the female connector, the first partially assembled unit is positioned within the first unsecured configuration. The first partially assembled unit 610 and the second partially assembled unit 810 are considered to be in the first unsecured configuration when the first flange 317 is positioned adjacent to the proximal end of the first track 527 and the second flange 318 is positioned adjacent with the proximal end of the second track 528. The unsecured configuration allows the first and second partially assembled units to easily separate apart from each other. On the other hand, the extended portion of the male connector of the first partially assembled unit is considered to be in the second secured configuration when the first flange 317 is positioned adjacent to the distal end 537 of the first track 527 and the second flange 318 is positioned adjacent to the distal end 538 of the second track 528. The secured configuration prevents the separation of the male connector of the ornamental structure 110 and the female connector 155 of the decorative piece 190 apart from each other, providing a secured connection in between the various components of the trophy. When the first partially assembled unit is fitted to the decorative piece of the second partially assembled unit, the extended portion of the first male connector of the ornamental or decorative structure is securely engaged with the female connector of the decorative piece through a twisting motion to form an assembled trophy. For instance, the various components of the trophy are securely engaged and assembled by twisting in a first direction. The first direction, for example, may be an anti-clockwise direction as illustrated in FIG. 8g. Alternatively, the first direction may be a clockwise direction. This completes the assembling of the various components of the trophy to form a trophy assembly as shown in FIG. 8g. When the first partially assembled unit and the second partially assembled unit need to be separated from each other, the male connector is rotated in a second direction opposite to the first direction. This allows the first and second partially assembled unit to change from the secured configuration to the unsecured configuration.

The method 800 as described and shown includes the use of first, second and third fastener elements in the form of a washer, a rod and a nut. It is understood that other suitable types of fastener or fastener elements may also be used.

FIGS. 9a-9d show simplified drawings illustrating another embodiment of a method 900 of assembling a trophy. The method 900 may be similar to the method 600 as described in FIGS. 6a-6f, method 700 as described in FIGS. 7a-7g or method 800 as described in FIGS. 8a-8g and may involve various components of the trophy having the male connector and female connector as described in FIGS. 3a-3e, FIGS. 4a-4e and FIGS. 5a-5f. Thus, common method steps, common features or features having the same reference numerals may not be described or described in detail.

Referring to FIG. 9a, a support base 750 is provided. The support base, in one embodiment, is a traditional support base and includes the same features as described in FIG. 7d. For example, the support base includes top and bottom surfaces which are substantially planar and includes an opening or bore 758 having a size which is sufficiently large to accommodate a fastener or fastener element as will be described later.

Similar to that described in FIG. 8b, first, second and third fastener elements are provided. The first fastener element 820, for example, includes a washer with a washer head 821 and internal thread, the second fastener element 825 includes a rod having first and second threaded end portions 827 and 828 while the third fastener element 830 includes a nut 830 similar to that described in FIG. 7f. The nut may include any suitably shaped nut.

As shown in FIG. 9a, a female connector 155 as described in FIGS. 5a-5f is provided. The female connector 155, in one embodiment, is provided in the form of a standalone cap or coupling unit 170. The female connector 155 in the form of a standalone coupling unit may be provided over the top surface 751 of the support base 750 which is substantially planar as will be described later. The female connector 155 in the form of a standalone coupling unit 170 includes a housing member 511 and a base 512. The housing member, for example, includes a first surface 511a defined at the first end, a second surface 511b defined at the second end, a central cavity 515, a first guide rail 517, a second guide rail 518, a first track 527 and a second track 528 as described in FIGS. 5a-5f. In one embodiment, the housing member also includes an opening 554 which extends through the first and second surfaces of the base 512. The opening 554, for example, is concentrically positioned within the central cavity 515 of the housing member 511.

The method 900 continues to join the first and second fastener elements similar to that as described in FIG. 8d. For example, the second fastener element 825 (e.g., rod) having top threaded end 827 is drawn up by rotating in a first direction to be engaged with the internal thread of the first fastener component 820 (e.g., washer). As shown, this leaves the bottom threaded end 828 of the second fastener element exposed. The method continues by inserting the first and second fastener elements into the coupling unit 170 through the central cavity 515 of the housing member. At this stage, the secured first and second fastener elements pass through the central cavity 515 and the opening 554 at the base 512 of the coupling unit 170, leaving the bottom threaded end 828 of the second fastener element exposed and extends beyond the bottom surface of the coupling unit. As shown in FIG. 9a, the head 821 of the first fastener element rests within the opening 554 of the base 512.

The method 900 continues to join the coupling unit 710 to the support base 750 to form a partially assembled unit 910. The partially assembled unit may be referred to as a second or bottom partially assembled unit. To join the female connector 155 in the form of a standalone coupling unit 170 with the support base 750, the exposed bottom threaded end 828 of the second fastener element is inserted through the opening 758 of the support base as shown in FIG. 9b. To properly position the coupling unit with respect to the support base, the exposed bottom threaded end of the second fastener element is aligned with the opening. Once the bottom threaded end is inserted into the opening, the base 512 of the coupling unit rests on top of or above the top surface 751 of the support base which is substantially planar. At this stage, the coupling unit is in an unsecured configuration as it is still moveable in the z-direction.

Referring to FIG. 9b, the method 900 continues by providing the third fastener element 830 (e.g., nut). Thus, after the bottom threaded end of the second fastener element is inserted into the opening 758 and the third fastener element is drawn up by rotating in the first direction, the support base is securely engaged with the coupling unit. The first direction, for example, may be a clock-wise direction. Such secured configuration prevents the separation of the coupling unit and the support base apart from each other, providing a secured connection in between the support base and the coupling unit. This completes the formation of the second or bottom partially assembled unit 910 as shown in FIG. 9b. When the coupling unit and the support base need to be separated from each other, the third fastener element is rotated in a second direction opposite to the first direction. The second direction, for example, may be an anti-clockwise direction. This, for example, allows the partially assembled unit to change from the secured configuration to the unsecured configuration.

The method 900 continues by providing the first partially assembled unit 610. The first partially assembled unit 610 is the same as that described and shown in FIG. 6b and is formed by techniques as described in FIGS. 6a-6b. Thus, such details will not be repeated herein. Referring to FIG. 9c, to join the first partially assembled unit 610 and the second partially assembled unit 910, the first flange 317 of the male connector is engaged with the first track 527 through the first guide rail 517 of the female connector, and the second flange 318 of the male connector is engaged with the second track 528 through the second guide rail 517 of the female connector. To properly position the extended portion of the male connector of the first partially assembled unit with respect to the female connector of the second partially assembled unit, the first flange is aligned with the first guide rail and the second flange is aligned with the second guide rail. Once the male connector is inserted into the female connector through the first guide rail and the second guide rail, the first flange and the second flange can be respectively moved in between the proximal end and the distal end of the first track 527 and the second track 528. Thus, the male connector is able to move in between a first unsecured configuration and a second secured configuration.

When the male connector 115 is inserted into the female connector 155, the first partially assembled unit 610 is positioned within the first unsecured configuration. The first partially assembled unit 610 and the second partially assembled unit 910 are considered to be in the first unsecured configuration when the first flange 317 is positioned adjacent to the proximal end of the first track 527 and the second flange 318 is positioned adjacent with the proximal end of the second track 528. The unsecured configuration allows the first and second partially assembled units to easily separate apart from each other. On the other hand, the extended portion of the male connector 115 of the first partially assembled unit 610 is considered to be in the second secured configuration when the first flange 317 is positioned adjacent to the distal end 537 of the first track 527 and the second flange 318 is positioned adjacent to the distal end 538 of the second track 528. The secured configuration prevents the separation of the male connector and the female connector apart from each other, providing a secured connection in between the various components of the trophy. When the first partially assembled unit is fitted to the coupling unit of the second partially assembled unit, the extended portion of the first male connector of the ornamental or decorative structure is securely engaged with the female connector of the coupling unit through a twisting motion to form an assembled trophy. For instance, the various components of the trophy are securely engaged and assembled by twisting in a first direction. The first direction, for example, may be an anti-clockwise direction as illustrated in FIG. 9d. Alternatively, the first direction may be a clockwise direction. This completes the assembling of the various components of the trophy to form a trophy assembly as shown in FIG. 9d. When the first partially assembled unit and the second partially assembled unit need to be separated from each other, the male connector is rotated in a second direction opposite to the first direction. This allows the first and second partially assembled unit to change from the secured configuration to the unsecured configuration.

The method 900 as described and shown includes the use of first, second and third fastener elements in the form of a washer, a rod and a nut. It is understood that other suitable fastener elements may also be used.

The various shape and size of the ornamental or decorative structure, the riser, the decorative piece, the coupling unit and the base of the trophy as shown above are for illustrative purposes. It is understood that the ornamental or decorative structure, the riser, the decorative piece, the coupling unit and the base of the trophy can be in various other suitable designs, shapes or configurations. The various components of the trophy can be made of any suitable materials. For example, the base of the trophy can be made of suitable materials, including plastic, marble, wood, etc. Furthermore, in some of the embodiments, fasteners such as screw, bolt, washer, rod and nuts are shown. It is understood that other suitable types of fasteners are also useful.

The embodiments as described in this disclosure provide various advantages. The locking mechanism and the methods as presented in this disclosure allow assembling various components of trophy which minimize the use of traditional assembling techniques which mainly utilize nuts, rods and screws to assemble a trophy together. Moreover, the locking mechanism as described allows any two individual components of the trophy to be securely fastened or to allow removal of the assembled trophy or partially assembled unit into individual components using a twisting motion or rotation. Thus, the locking mechanism offers flexibility to assemble two or more components of the trophy as well as to disassemble partially assembled unit through a twisting motion. This provides users or retailers flexibility to utilize and to mix and match any existing or new components of the trophy to be assembled and disassembled. This further allows retailer phase to clear existing stock in hand. Additionally, the locking mechanism as proposed reduces or avoids the use of screw and nuts to assemble two or more components together. This lessens the assembly time and the locking mechanism may also be incorporated into traditional assembling method. Moreover, the methods of assembling a trophy as described are simplified and are cost effective as less hardware in the form of screws, nuts and rod are used and hardware or tools to tighten the screws, nuts and rod are not required.

The present disclosure may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. An assembly for an article comprising:
a first assembly component with a first connector;
a second assembly component with a second connector; and
wherein the first and second connectors are configured to engage in a reversible locking mechanism as male and female connectors to form the assembly, the female connector comprises grooves and each groove includes segments configured to receive flanges of the male connector, wherein one of the segments is configured to accommodate one of the flanges in a rotating direction and includes a smooth tapered profile having a first end which is wider than a second end, wherein the second end is in communication with a slot configured to accommodate and maintain the flanges in a locked position.

2. The device of claim 1 wherein the male connector includes a column member with a first end and a second end, wherein the flanges of the male connector comprise first and second flanges which extend outwardly from the column member at the second end of the column member, the first and second flanges are positioned in diametric opposition with each other.

3. The device of claim 1 wherein the female connector comprises a housing member and a base disposed below the housing member, wherein the housing member is in the form of a cylindrical structure having a first end, a second end, an outer surface and an inner surface defining a central cavity, wherein the second end of the housing member is coupled to the base; and
wherein the grooves are disposed in the inner surface of the central cavity of the female connector.

4. The device of claim 3 wherein the grooves include first and second grooves and each groove further includes
a first segment for accommodating another of the flanges in an inserting direction; and
wherein the one of the segments configured to accommodate the one of the flanges in the rotating direction is a second segment.

5. The device of claim 4 wherein the slot of the second segment is configured to increase a height of the second end of the second segment to accommodate and maintain the flanges in the locked position.

6. The device of claim 5 wherein a height of the second segment of the first and second grooves each before the slot at the second end is less than a height of one flange of the male connector in order to securely lock the one flange in the locked position.

7. The device of claim 6 wherein
the first segments of the first and second grooves comprise a first guide rail and a second guide rail; and
the second segments of the first and second grooves comprise a first track and a second track, wherein the central cavity, the first guide rail and the second guide rail are configured and dimensioned to receive the column member and the flanges of the male connector.

8. The device of claim 7 wherein the first track and the second track are circumferentially extending and oppositely positioned from each other in a sidewall of the inner surface of the housing member, and the first track and the second track each comprises the first end and the second end of the second segment, and wherein the first end of the first track is in communication with the first guide rail while the first end of the second track is in communication with the second guide rail.

9. The device of claim 1 wherein
the first assembly component is an ornamental structure having a first end and a second end, the male connector is disposed at the second end of the ornamental structure; and
the second assembly component is a support base, the female connector is adapted as part of a top surface of the support base; and
wherein the male connector is inserted into the second female connector to form the assembly.

10. The device of claim 1 further comprising a third assembly component, wherein the third assembly component comprises a first end and a second end and a second female connector having a tubular element in the form of a cylindrical hollow tube extending from the first end towards the second end of the third assembly component, wherein the tubular element comprises a first opening and a second opening defining a central cavity, a first guide rail and a second guide rail provided in the form of vertical grooves in communication with the central cavity, and wherein the central cavity, the first guide rail and the second guide rail of the tubular element are configured and dimensioned to receive a column member, a first flange and a second flange of the male connector.

11. The device of claim 10 wherein
the first assembly component is an ornamental structure having a first end and a second end, the male connector is disposed at the second end of the ornamental structure;
the second assembly component is a support base, the first female connector is adapted as part of a top surface of the support base; and
the third assembly component is a riser.

12. A trophy assembly comprising:
a first trophy component with a first connector;
a second trophy component with a second connector; and
wherein the first and second connectors are configured to engage in a reversible locking mechanism as male and female connectors to form the trophy assembly, the female connector comprises grooves configured to receive flanges of the male connector, wherein each groove includes:
a first segment for accommodating one of the flanges in an inserting direction, and
a second segment for accommodating another of the flanges in a rotating direction, the second segment includes a smooth tapered profile in which a first end of the second segment is wider than a second end of the second segment, wherein the second end of the second segment is in communication with a slot configured to accommodate and maintain the flanges in a locked position.

13. A method of assembling an article comprising:
providing a first assembly component with a first connector;
providing a second assembly component with a second connector;
wherein the first and second connectors are configured to engage in a reversible locking mechanism as male and female connectors to form the assembly, the female connector comprises grooves and each groove includes segments configured to receive flanges of the male connector, wherein one of the segments is configured to accommodate one of the flanges in a rotating direction and includes a smooth tapered profile having a first end which is wider than a second end, wherein the second end is in communication with a slot configured to accommodate and maintain the flanges in a locked position; and assembling the first and second assembly components by inserting the male connector into the female connector and twisting the components to cause the flanges of the male connector to be in the slots and locked into the locked position.

14. The method of claim 13 wherein the male connector includes a column member with a first end and a second end, wherein the flanges of the male connector comprise first and second flanges which extend outwardly from the column member at the second end of the column member, the first and second flanges are positioned in diametric opposition with each other; and the female connector includes a housing member and a base disposed below the housing member, wherein the housing member is in the form of a cylindrical structure having a first end, a second end, an outer surface and an inner surface defining a central cavity, wherein the second end of the housing member is coupled to the base, and wherein the grooves are disposed in the inner surface of the central cavity, the grooves include first and second grooves and each groove includes
 a first segment for accommodating another of the flanges in an inserting direction, and
 wherein the one of the segments configured to accommodate the one of the flanges in the rotating direction is a second segment.

15. The method of claim 14 wherein the first segments of the first and second grooves comprise a first guide rail and a second guide rail; and the second segments of the first and second grooves comprise a first track and a second track, wherein the central cavity, the first guide rail and the second guide rail are configured and dimensioned to receive the column member and the flanges of the male connector.

16. The method of claim 15 wherein the first track and the second track are circumferentially extending and oppositely positioned from each other in a sidewall of the inner surface of the housing member, and the first track and the second track each comprises the first end and the second end of the second segment, and wherein the first end of the first track is in communication with the first guide rail while the first end of the second track is in communication with the second guide rail.

17. The method of claim 16 comprising:

forming a first partially assembled unit by inserting the male connector into the female connector, wherein the insertion comprises
 positioning the first flange to the first end of the first track and the second flange to the first end of the second track, and
 performing the twisting motion in a first direction to move the first flange from the first end to the second end of the first track and to move the second flange from the first end to the second end of the second track such that at least the first and second assembly components are securely engaged.

18. The method of claim 17 further comprising providing a third assembly component, wherein the third assembly component comprises a first end and a second end and a second female connector having a tubular element in the form of a cylindrical hollow tube extending from the first end towards the second end of the third assembly component, wherein the tubular element comprises a first opening and a second opening defining a central cavity, a first guide rail and a second guide rail provided in the form of vertical grooves in communication with the central cavity, and wherein the central cavity, the first guide rail and the second guide rail of the tubular element are configured and dimensioned to receive the column member, the first flange and the second flange of the male connector.

19. The method of claim 18 wherein the first assembly component is an ornamental structure having a first end and a second end, the male connector is disposed at the second end of the ornamental structure;

the second assembly component is a support base, the first female connector is adapted as part of a top surface of the support base; and the third assembly component is a riser.

20. A method of assembling a trophy comprising:

providing a first trophy component with a first connector;

providing a second trophy component with a second connector;

wherein the first and second connectors are configured to engage in a reversible locking mechanism as male and female connectors to form the trophy assembly, the female connector comprises grooves configured to receive flanges of the male connector, wherein each groove includes:
 a first segment for accommodating one of the flanges in an inserting direction, and
 a second segment for accommodating another of the flanges in a rotating direction, the second segment includes a smooth tapered profile in which a first end of the second segment is wider than a second end of the second segment, wherein the second end of the second segment is in communication with a slot configured to increase a height of the second end of the second segment to accommodate and maintain the flanges in the locked position; and assembling the first and second trophy components by inserting the male connector into the female connector and twisting the components to cause the flanges of the male connector to be in the slots and locked into the locked position.

* * * * *